United States Patent [19]

Ebel et al.

[11] Patent Number: 5,500,732
[45] Date of Patent: Mar. 19, 1996

[54] LENS INSPECTION SYSTEM AND METHOD

[75] Inventors: James Ebel; Mary L. Dolan; Russell J. Edwards, all of Jacksonville, Fla.; Peter W. Sites, Knoxville, Tenn.

[73] Assignee: Johnson & Johnson Vision Products, Inc., Jacksonville, Fla.

[21] Appl. No.: 257,857

[22] Filed: Jun. 10, 1994

[51] Int. Cl.⁶ .................................................. G01B 9/00
[52] U.S. Cl. ............................................................ 356/124
[58] Field of Search .................................. 356/124–127, 356/237, 239, 240; 250/223 R, 223 B, 562, 572; 348/127, 125; 382/32.1, 100; 351/160 R

[56] References Cited

U.S. PATENT DOCUMENTS

| | | | |
|---|---|---|---|
| 3,770,969 | 11/1973 | Ansevin et al. | 356/240 |
| 3,822,096 | 7/1974 | Wilms et al. | 356/124 |
| 4,002,823 | 1/1977 | Van Oosterhout | 356/237 |
| 4,691,231 | 9/1987 | Fitzmorris et al. | 356/240 |
| 5,080,839 | 1/1992 | Kindt-Larsen . | |

FOREIGN PATENT DOCUMENTS

| | | | |
|---|---|---|---|
| 2057832 | 6/1992 | Canada . | |
| 0134339 | 10/1980 | Japan | 356/124 |

*Primary Examiner*—Hoa Q. Pham

[57] ABSTRACT

A system and method for inspecting ophthalmic lenses. The system comprises a transport subsystem for moving the lenses into an inspection position, and an illumination subsystem to generate a light beam and to direct the light beam through the lenses. The system further comprises an imaging subsystem to generate a set of signals representing selected portions of the light beam transmitted through the lenses, and a processing subsystem to process those signals according to a predetermined program. The illumination subsystem includes a light source to generate a light beam and a diffuser to form that light beam with a generally uniform intensity across the transverse cross section of the light beam. The illumination subsystem further includes a lens assembly to focus a portion of the light beam onto an image plane, and to focus a portion of the light beam onto a focal point in front of the image plane to form a diffuser background pattern on the image plane.

16 Claims, 25 Drawing Sheets

FIG.8

| $P_{i-1,j-1}$ | $P_{i-1,j}$ | $P_{i-1,j+1}$ |
|---|---|---|
| $P_{i,j-1}$ | $P_{i,j}$ | $P_{i,j+1}$ |
| $P_{i+1,j-1}$ | $P_{i+1,j}$ | $P_{i+1,j+1}$ |

FIG.24

| | 1 | 2 | 3 | 4 | 5 | 6 | 7 | 8 | 9 | 10 | 11 |
|---|---|---|---|---|---|---|---|---|---|---|---|
| 1 | -1 | -1 | -1 | -1 | -1 | 0 | 1 | 1 | 1 | 1 | 1 |
| 2 | -2 | -2 | -2 | -2 | -2 | 0 | 2 | 2 | 2 | 2 | 2 |
| 3 | -2 | -2 | -2 | -2 | -2 | 0 | 2 | 2 | 2 | 2 | 2 |
| 4 | -2 | -2 | -2 | -2 | -2 | 0 | 2 | 2 | 2 | 2 | 2 |
| 5 | -4 | -4 | -4 | -4 | -4 | 0 | 4 | 4 | 4 | 4 | 4 |
| 6 | -4 | -4 | -4 | -4 | -4 | 0 | 4 | 4 | 4 | 4 | 4 |
| 7 | -4 | -4 | -4 | -4 | -4 | 0 | 4 | 4 | 4 | 4 | 4 |
| 8 | -2 | -2 | -2 | -2 | -2 | 0 | 2 | 2 | 2 | 2 | 2 |
| 9 | -2 | -2 | -2 | -2 | -2 | 0 | 2 | 2 | 2 | 2 | 2 |
| 10 | -2 | -2 | -2 | -2 | -2 | 0 | 2 | 2 | 2 | 2 | 2 |
| 11 | -1 | -1 | -1 | -1 | -1 | 0 | 1 | 1 | 1 | 1 | 1 |

FIG.25

| | 1 | 2 | 3 | 4 | 5 | 6 | 7 | 8 | 9 | 10 | 11 |
|---|---|---|---|---|---|---|---|---|---|---|---|
| 1 | -1 | -2 | -2 | -2 | -4 | -4 | -4 | -2 | -2 | -2 | -1 |
| 2 | -1 | -2 | -2 | -2 | -4 | -4 | -4 | -2 | -2 | -2 | -1 |
| 3 | -1 | -2 | -2 | -2 | -4 | -4 | -4 | -2 | -2 | -2 | -1 |
| 4 | -1 | -2 | -2 | -2 | -4 | -4 | -4 | -2 | -2 | -2 | -1 |
| 5 | -1 | -2 | -2 | -2 | -4 | -4 | -4 | -2 | -2 | -2 | -1 |
| 6 | 0 | 0 | 0 | 0 | 0 | 0 | 0 | 0 | 0 | 0 | 0 |
| 7 | 1 | 2 | 2 | 2 | 4 | 4 | 4 | 2 | 2 | 2 | 1 |
| 8 | 1 | 2 | 2 | 2 | 4 | 4 | 4 | 2 | 2 | 2 | 1 |
| 9 | 1 | 2 | 2 | 2 | 4 | 4 | 4 | 2 | 2 | 2 | 1 |
| 10 | 1 | 2 | 2 | 2 | 4 | 4 | 4 | 2 | 2 | 2 | 1 |
| 11 | 1 | 2 | 2 | 2 | 4 | 4 | 4 | 2 | 2 | 2 | 1 |

FIG.36
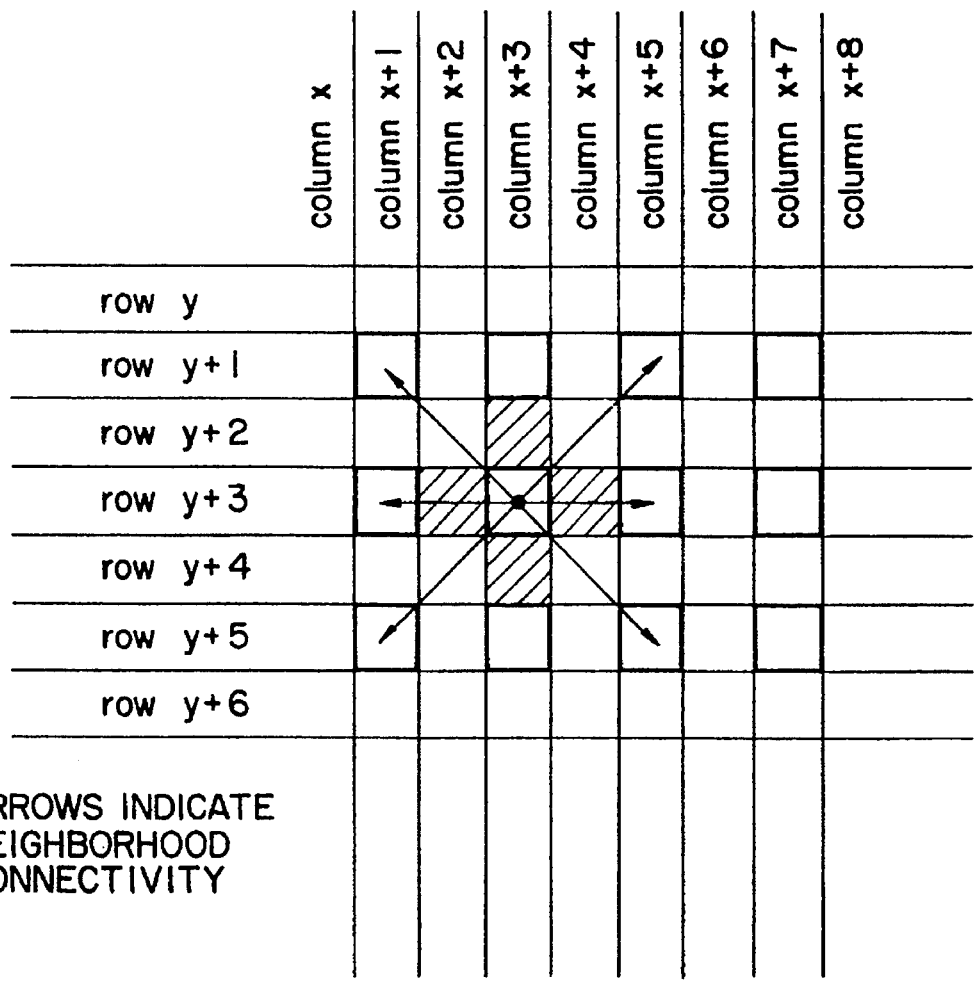
ARROWS INDICATE
NEIGHBORHOOD
CONNECTIVITY
=pixel used in subsampled pattern  =pixel used in gradient calcualtion

LENS INSPECTION SYSTEM AND METHOD

BACKGROUND OF THE INVENTION

This invention generally relates to systems for inspecting ophthalmic lenses, and more particularly, to a high speed, automated system for inspecting contact lenses.

Recently, several automated systems have been developed for producing ophthalmic lenses, and in particular, contact lenses; and, for example, one such system is disclosed in U.S. Pat. No. 5,080,839. These systems have achieved a very high degree of automation; and, for instance, the lenses may be molded, removed from the molds, further processed, and packaged without any direct human involvement.

Moreover, in these automated systems, contact lenses are, typically, made with a high degree of precision and accuracy. Nevertheless, on rare occasions, a particular lens may contain some irregularity; and, for this reason, contact lenses are inspected before sale to the consumer to be certain that the lenses are acceptable for consumer use.

Ophthalmic lenses may also be inspected automatically, and very reliable and accurate automated lens inspection systems are known. Some of these automated systems tend to concentrate on inspecting the peripheries or outer portions of the lenses. It is thus believed that these systems could be improved by providing a procedure for better inspecting the center portions of the lenses.

SUMMARY OF THE INVENTION

An object of this invention is to improve systems for inspecting ophthalmic lenses.

Another object of the present invention is to provide an automated lens inspection system with an illumination system that produces an image of a lens in which any defects in the center of the lens are enhanced.

A further object of this invention is to produce an image of a contact lens in which the peripheral zone of the lens is visibly distinguishable.

Another object of this invention is to provide an automated system for inspecting contact lenses for very small irregularities in the centers of the lenses.

These and other objectives are attained with a system and method for inspecting ophthalmic lenses. The system comprises a transport subsystem for moving the lenses into an inspection position, an illumination subsystem to direct a light beam through the lenses, an imaging subsystem to generate a set of signals representing the light beam transmitted through the lenses and a processing subsystem to process those signals. The illumination subsystem includes a diffuser to form the light beam with a generally uniform intensity across the transverse cross section of the light beam.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 8 schematically depicts a portion of a pixel array of the imaging subsystem, and the notation used to refer to the pixels of the array.

FIGS. 24 and 25 show two operators used to help identify the junction between the peripheral and optical zones.

FIG. 36 illustrates the pixel neighborhoods used for subsampling and gradient calculations.

DETAILED DESCRIPTION OF THE PREFERRED EMBODIMENTS

Figure 1:
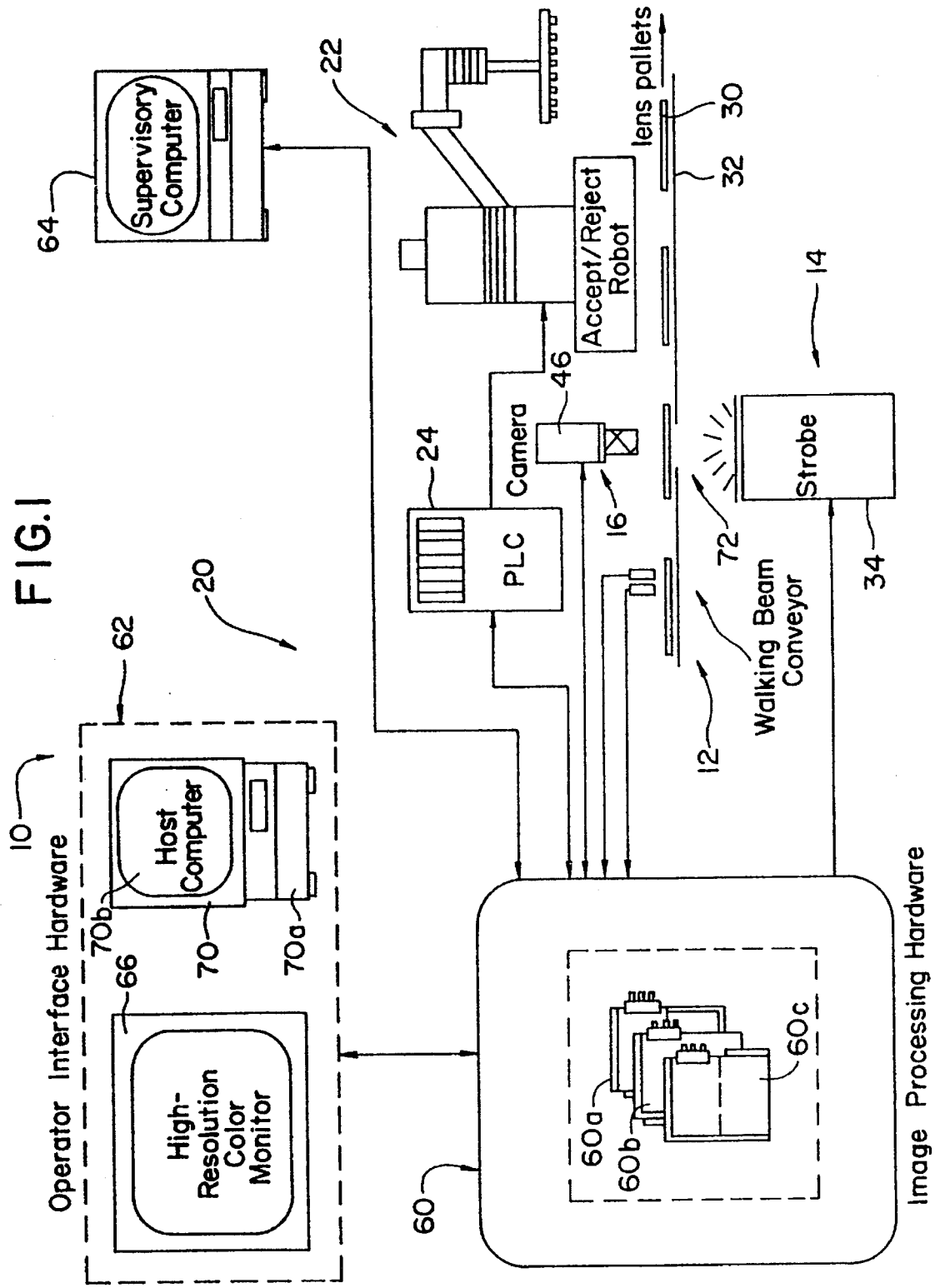
FIG. 1 is a block diagram illustrating a lens inspection system embodying the present invention.

FIG. 1 illustrates lens inspection system 10; and, generally, system 10 comprises transport subsystem 12, illumination subsystem 14, imaging subsystem 16 and processing subsystem 20. FIG. 1 also shows reject mechanism 22, reject controller 24, and a plurality of pallets 30, each of which holds a group of lens packages.

Figure 2:
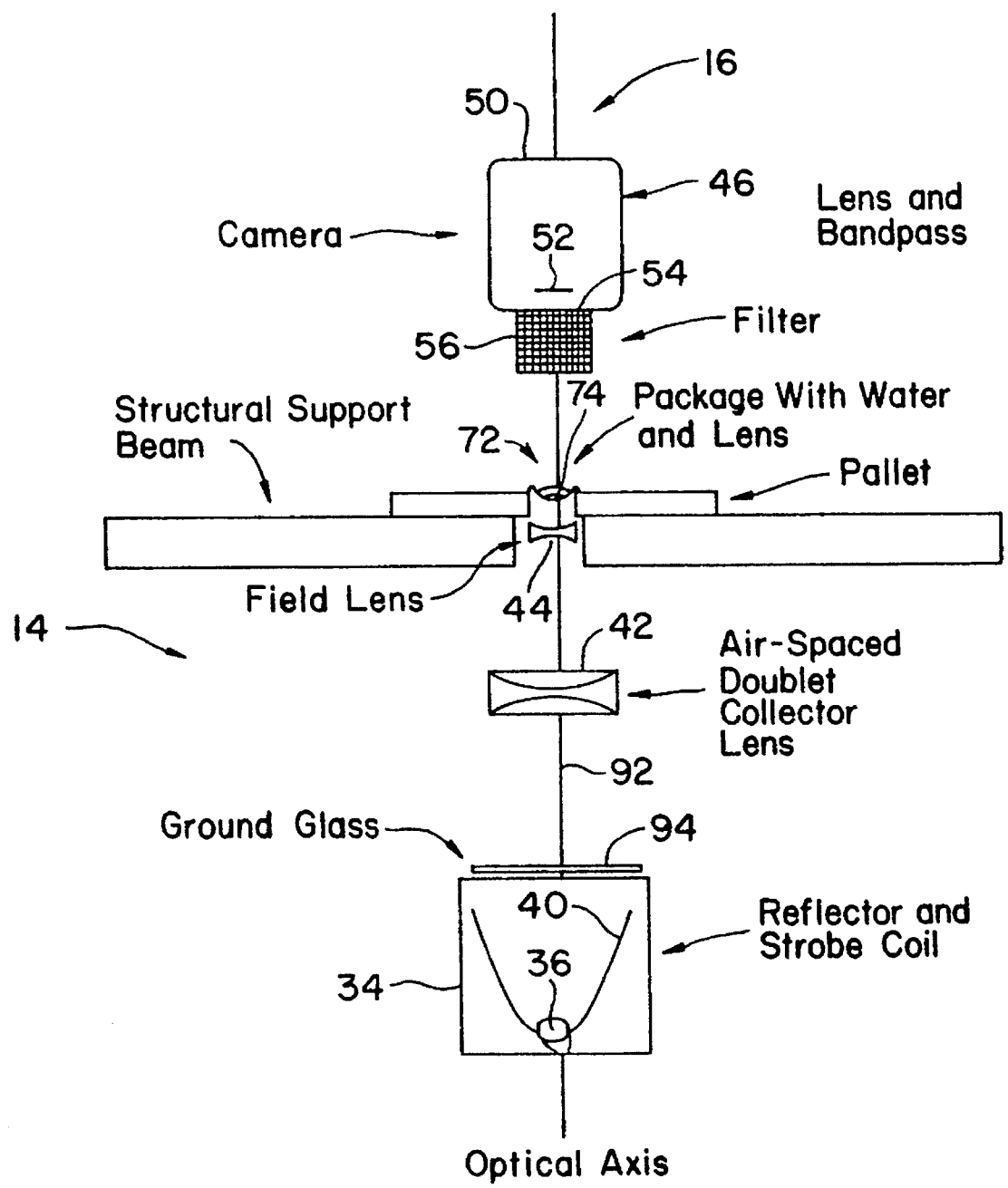
FIG. 2 shows the illuminating and imaging subsystems of the inspection system shown in FIG. 1.

With reference to FIGS. 1 and 2, preferably transport subsystem 12 includes conveyor belt 32; and illumination subsystem 14 includes housing 34, light source 36, reflector 40, and lenses 42 and 44. Also, with this preferred system 10, imaging subsystem 16 includes camera 46, and this camera, in turn, includes housing 50, pixel array 52, shutter 54, and lens assembly 56. Processing subsystem 20 includes image processor means 60, operator interface means 62, and supervisory computer 64; and, more specifically, processor means 60 includes a plurality of processor and memory boards 60a, 60b, and 60c, and interface means 62 includes monitor 66 and host computer 70.

Generally, transport subsystem 12 is provided to move a multitude of ophthalmic lenses along a predetermined path and into a lens inspection system, referenced at 72 in FIG. 1. Illumination subsystem 14 is provided to generate a light beam and to direct that beam through the lenses moving through the lens inspection position. Subsystem 16 generates a set of signals representing the light beam, or portions thereof, transmitted through each inspected lens, and then transmits those signals to processing subsystem 20. Subsystem 20 receives those signals from subsystem 16 and processes those signals according to a predetermined program. For each inspected lens, subsystem 20 generates a signal indicating at least one condition of the lens; and with the embodiment of subsystem 20 disclosed herein in detail, the subsystem generates a signal indicating whether each inspected lens is suitable for consumer use.

Figure 3:
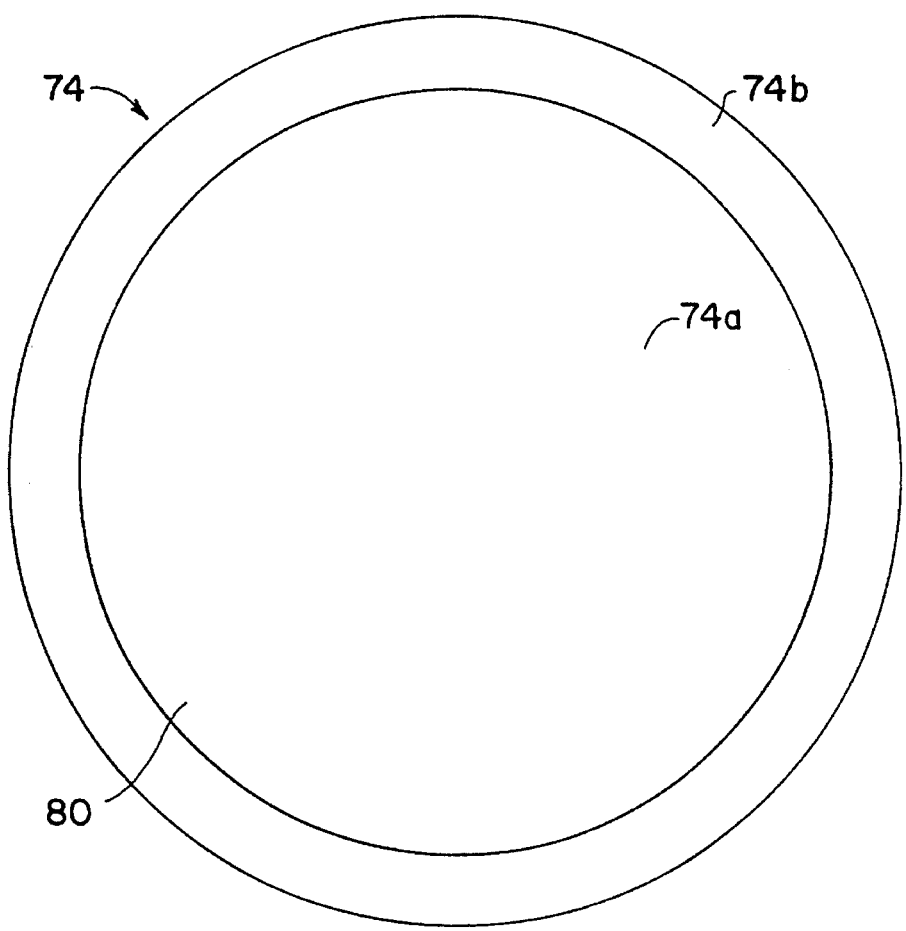
FIG. 3 is a plan view of an ophthalmic lens that may be inspected in the system of FIG. 1.
Figure 4:
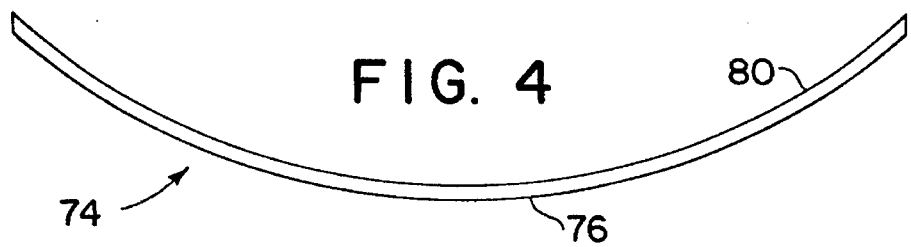
FIG. 4 is a side view of the ophthalmic lens of FIG. 3.
Figure 4A:
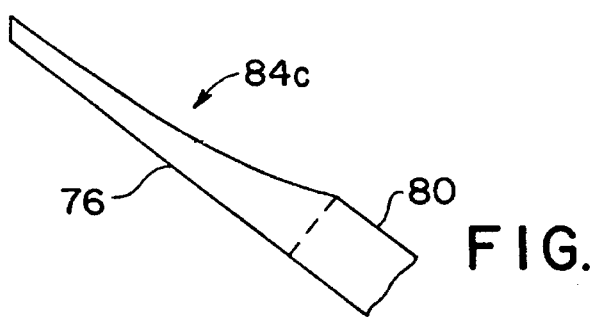
FIG. 4A is an enlarged view of a portion of an outer annulus of the ophthalmic lens.

System 10 may be used to inspect a large variety of types and sizes of ophthalmic lenses. The system is particularly well suited for inspecting contact lenses, and FIGS. 3 and 4 illustrate, for example, contact lens 74 that may be inspected in system 10. Lens 74 has a generally hollow, semi-spherical shape, including front and back surfaces 76 and 80, and the lens forms a central optical zone 74a and a peripheral zone 74b. The lens has a substantially uniform thickness; however, as particularly shown in FIG. 4A, the thickness of the lens gradually decreases over the annulus 74c immediately adjacent the outside edge of the lens.

Figure 5:
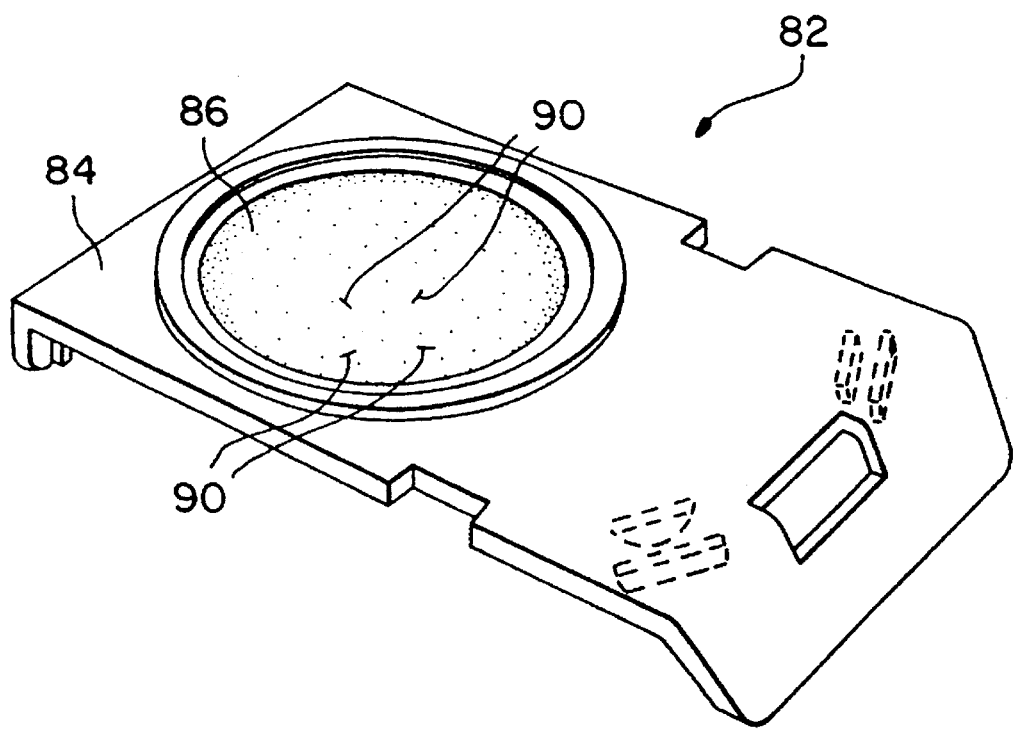
FIG. 5 is a top perspective view of a package that may be used to hold the ophthalmic lens.
Figure 6:
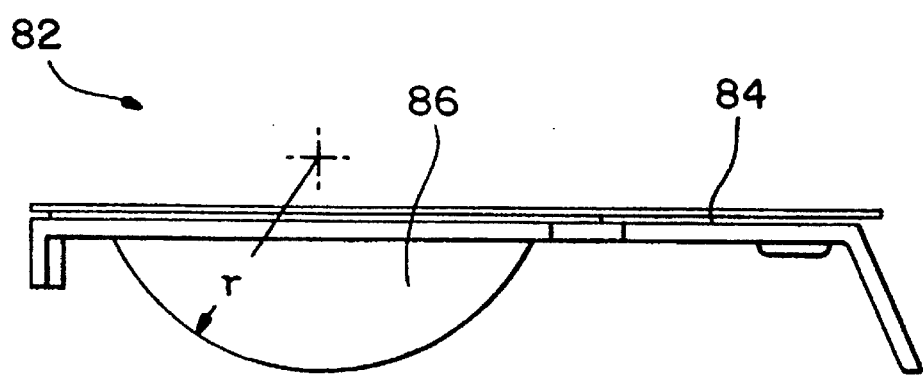
FIG. 6 is a side view of the package shown in FIG. 5.
Figure 7:
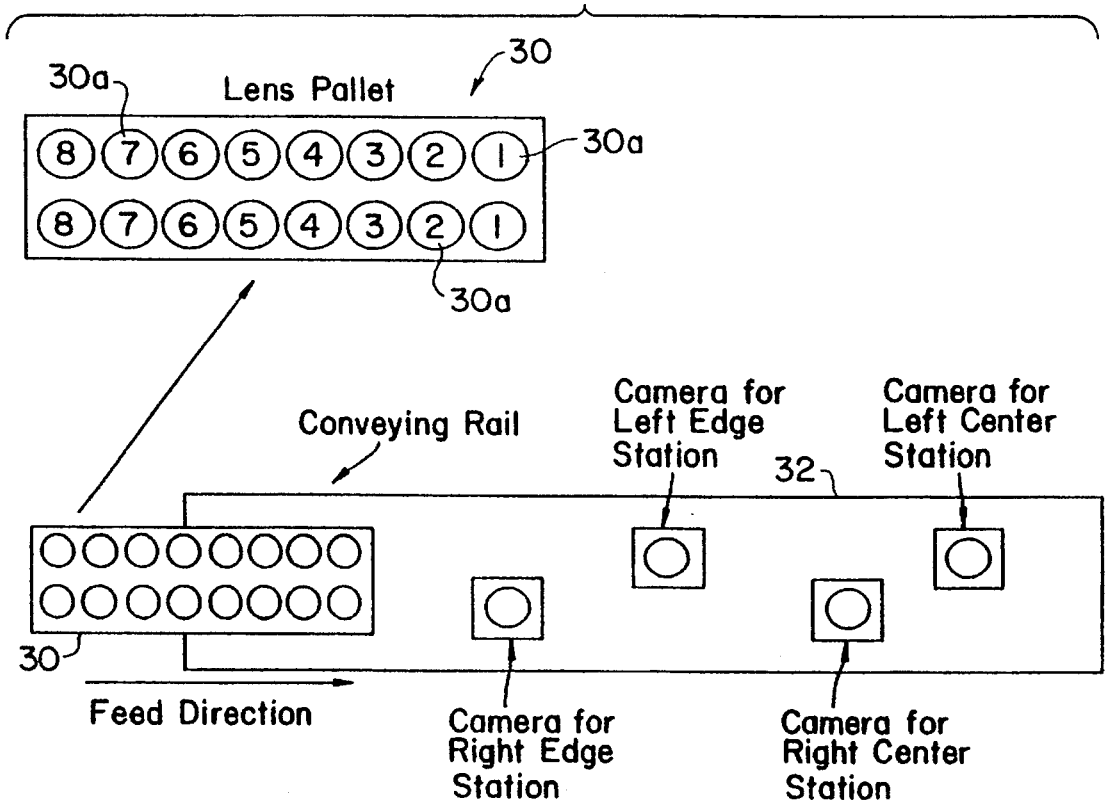
FIG. 7 shows a pallet that may be used to carry a group of the package through the system of FIG. 1.

In the preferred operation of system 10, lenses 74 are located in individual packages or carriers, and these carriers are held in pallets 30 that are transported by conveyor 32 through the inspection position 72. Various types of lens carriers and carrier pallets may be used with system 20; and FIGS. 5 and 6 illustrate a carrier 82 that may be used to hold a lens 74, and FIG. 7 shows a pallet 30 that may be used to hold a group of packages 82.

Carrier 82 includes a substantially planar first surface 84, and formed within this planar first surface is bowl or recess 86, which is concave when viewed from the top of the carrier. A respective lens 74 is located in cavity 86 of each carrier 82; and preferably, the lens is fully submerged in a solution, such as deionized water, in the carrier cavity. Preferably, the radius of curvature, r, of cavity 86 is larger than the radius of curvature of the ophthalmic lens 74 placed therein, so that when a lens 74 is placed in a cavity 86, the surfaces of the carrier 82 that form the cavity tend to center the lens at the bottom of the cavity due to the shape of the cavity.

Within the bowl 86 are contained a plurality of ribs or tic marks 90 that are located near, but spaced from, the center of the bowl. These tic marks may be used to help hold lens 74 in recess 86 as deionized water is removed from the recess. Preferably, the lens, when centered in recess 86, does not make contact with the tic marks, and instead the lens touches only the center of the recess bottom at a point. With the embodiment of carrier 82 shown in the drawings, each rib 90 is 0.5 mm long and 0.025 mm wide, and each rib is located 3.0 mm from the center of bowl 86 and 6.0 mm from the end of its collinear partner.

System 10 may be used independent of any specific method or apparatus for placing or depositing lenses in lens carriers 82. System 10 is well suited, though, for use in a larger system in which lenses 74 are automatically made, inspected, further processed, and then placed in carriers 82 by robots or automated lens handling apparatus (not shown).

With reference to FIG. 7, the embodiment of pallet 30 shown therein is designed to hold a multitude of packages or carriers 82 in two rows, and the pallet may be provided with recesses or receptacles 30a for receiving the carriers. With this arrangement, system 10 may be provided with two cameras 46, one to inspect each row of packages 82 in pallets 30. Also, system 10 may be provided with additional inspection cameras; and, for instance, the system may be provided with additional cameras specifically used to inspect the peripheral areas of lenses 74.

With reference again to FIG. 1, conveyor belt 32 of transport subsystem 12 is mounted on a pair, or more, of pulleys (not shown) that support the belt for movement around an endless path. One of those pulleys may be connected to a suitable drive means (not shown) to rotate the pulley and, thereby, move the conveyor belt around that endless path. Preferably, the drive means is operated so that lenses 74 are moved through system 10 in a smooth, continuous or substantially continuous manner. Alternatively, though, lenses 74 may be moved or indexed through system 10 in a discontinuous or stepwise manner, and in particular, each lens may be stopped for a brief period of time below imaging subsystem 16.

More specifically, the preferred design of the system 10 is such that groups of lenses are inspected in cycles that correspond to pallet transfers. The conveying system utilizes a mechanism, referred to as a walking beam mechanism, where pallets are pushed by an arm attached to a linear slide. The slide extends to move the pallet forward. Upon completing the slide's stroke, its arm is retracted and the slide returns to its starting position to begin another pallet transfer. A complete pallet transfer occurs in three stages: a start and acceleration stage, a constant velocity stage, and a deceleration/stop stage. It is during this constant velocity stage of movement that lenses are under the cameras 46 and are being imaged. Preferably, an entire cycle takes approximately twelve seconds, and the resulting throughput is sixteen lenses approximately every 12 seconds. Also, preferably, a single pallet cycle begins with a pallet transfer, and the pallet is at a constant velocity before reaching the camera 46 and continues at that constant speed until all the lens images have been captured.

In addition, any suitable ejector or reject mechanism 22 may be employed in system 10. Preferably, mechanism 22 is controlled by controller 24; and in particular, when controller 24 receives a signal from subsystem 20 that a lens is not suitable, the controller actuates mechanism 22 to remove the package having that lens from the stream of packages moving past the reject mechanism. In the preferred operation of system 10, in which lenses 74 are carried through the inspection system by pallets 30, controller 24 operates mechanism 22 to remove only the packages having lenses that have been determined to be unsuitable. Alternatively, a reject mechanism may be used that removes a whole pallet from system 10 in case any lens in the pallet is found unsuitable.

With reference to FIGS. 1 and 2, subsystem 14 is used to generate a light beam 92 and to direct that beam through lenses 74 in inspection position 72. More specifically, light source 36 is disposed in housing 34, inside and adjacent the apex of parabolic reflector 40. The top of housing 34 is transparent and is preferably covered by a plate 94 of ground glass, and a doublet lens 42 and a field lens 44 are located in series between light source 36 and lens inspection position 72. As shown in FIG. 2, field lens 44 is located below the inspection position 72, and doublet lens 42 is located below the field lens 44.

The preferred illuminating optics are designed for high contrast within the lens under test. To accomplish this, the two lenses 42 and 46 are used underneath the package. The purposes of these lenses are to condense the light and to compensate for the optical power created by the solution in cavity 86, as well as to enhance the optical contrast.

Lenses 42 and 44 are positioned so that they form a lens assembly that focuses different portions of light beam 92 at different locations. In particular, this lens assembly focuses a portion of the light beam 92 that passes through the ophthalmic lens 74 being tested, onto an image plane, specifically pixel array 52. This lens assembly also focuses a portion of light beam 92 onto a focal point, schematically referenced at 42a in FIG. 2, in front of the image plane to form a diffuse background pattern on the image plane.

In order to provide for the desired inspection of the center of lenses 74, the preferred illumination of the lens allows the whole center of the lens to be uniformly illuminated at grey levels in excess of 160, on a scale of 0 to 255. As discussed below, the camera sensor 52 is sensitive to grey levels ranging between 0 to 255. However, also as described in greater detail below, to enable the desired inspection of the center of the lenses, the peripheral zones of the lenses are a different grey level than the back optic zone, in order to generate a detectable boundary at the junction between the peripheral curve and the back optical curve. This boundary describes the inner circle of the peripheral zone and is, used to test for decentration due to misalignment of the back and front curve molds used to mold the lens 74.

The light source 36 is preferably a strobe lamp that is capable of producing, or firing, a five joule, ten microsecond pulse of light, whenever image processor 60 generates a command signal, referred to as a grab image command. A 450 millisecond recovery time is preferably provided for the strobe lamp to recover between firings of the light pulses.

The use of ground glass plate 94 affords higher energies of illumination, since most of the light energy remains unscattered from the pallet entrance pupil. A relatively small amount of light is scattered out of the optical path of the system, with most of the light reaching the camera sensor 52.

Since the lens package 82 has a curve to form a gravitational potential to center the lens in cavity 86, the package acts as a lens within the imaging subsystem 16. For example, with an embodiment of the invention that has actually been reduced to practice, package 82 acts as a lens with a focal lens of 25 mm. Thus, the light exiting package 82, if uncorrected, would sufficiently diverge prior to entering the camera lens 56 so as to miss the camera aperture. This would tend to underilluminate the image of the lens under test, and reduce the available contrast in the image of the lens produced on pixel array 52. To correct for this divergence, field lens 44 is placed under the package 82 to counteract the optical power of the solution in the package cavity 86.

With an embodiment of the invention that has been actually reduced to practice, singlet lens 44 is from Newport or Melles Griot, and is a −25 mm focal length biconcave glass lens. It has a center thickness of 2.5 mm and a nominal edge thickness of 7.73 mm, and the diameter of the singlet lens is 25.4 mm. A broadband antireflection coating is applied to the lens to reduce reflection and improve transmission through the lens, thus enhancing contrast. The coating chosen is the AR14, which is effective in the 430 to 700 nm wavelength region.

The doublet lens 42 is the collector lens for the illumination subsystem 14. The first focal point schematically represented at 42b of doublet lens 42 falls on the ground glass plate 94, in order to approximately collimate the light transmitted through the doublet lens. The doublet lens may be made of ordinary BK-7 glass, although a fused silica lens can be substituted without modification of the mechanical mounts.

Imaging subsystem 16 receives the light beam transmitted through the lens 74 in the inspection position 72 and generates a series of signals representing that light beam. With reference to FIGS. 1 and 2, pixel array 52 is disposed inside camera housing 50, directly behind shutter 54. Pixel array 52 is preferably comprised of a multitude of light sensors, each of which is capable of generating a respective electric current having a magnitude proportional to or representing the intensity of light incident on that sensor. As is conventional, preferably the light sensors, or pixels, of pixel array 52 are arranged in a uniform grid of a given number of rows and columns, and for example, that grid may consist of approximately one million pixels arranged in approximately 1000 columns and 1000 rows. FIG. 8 schematically illustrates a portion of a pixel array, and notation used herein to refer to pixels of the array.

Preferably, the capability of the vision subsystem 16 exceeds the resolution necessary to classify all of the specified conditions for which lenses 74 are inspected. For example, a camera may be used that is capable of resolving 0.012 mm objects. With 1,048,576 pixels in the imaged area, covering a 14.495 mm field of view, each pixel covers 0.01416 mm of linear object space. Thus, a lens condition, such as an extra piece or hole, covering exactly three pixels at its largest diameter would be no more than 0.0425 mm in size. Therefore, the vision system has the capability of detecting conditions smaller than what is commonly considered as the smallest flaw for which a lens may be rejected.

In the operation of system 10, imaging camera 46 may be focused on the peripheral zones of lenses 74. In this case, the center optical zones of lenses 74 are also in focus, due to the depth of field of the imaging lens. For example, the range of the field of view may be selected to yield a 0.000055 mm per pixel variation in pixel resolution, or a 0.057 millimeter total variation in the field of view across the image. Preferably, camera 46 is adjusted so that 989 pixels equals 14.000 mm of object space. This results in the above-mentioned single pixel resolution of 0.014156 mm per pixel, or a field of view of 14.496 mm for the full 1024 pixels across the image.

As will be understood by those of ordinary skill in the art, any suitable camera may be used in subsystem 16. With an embodiment of system 10 that has been actually reduced to practice, camera 46 was a Class I Kodak Megaplus high resolution camera with a Nikkor 55 mm standard lens. This camera has a 1320 by 1035 pixel sensor, of which only 1024 by 1024 pixels were employed. Since computer memory is binary in nature, and 1024 equals $2^{10}$, then an area $2^{10}$ pixels by $2^{10}$ pixels, or 1,048,576 pixels, produces data that is easier to handle within image memory from board level design considerations.

The camera lens aperture was set at f/4 with a field of view of 14.495 mm (lenses 74 in deionized water may be about 12.2 mm in diameter). Attached to the end of the camera lens was an Andover bandpass filter centered at a wavelength of 550 nm, with a 10 nm full wave half height window. Such a filter removes all possibility of chromatic aberrations, improves overall spatial resolution, and maintains a photopic response to the lens inspection similar to an inspector's ocular response. It also removes infrared light at the CCD detector. This is advantageous since such light would decrease the overall system modulation transfer function.

Processing subsystem 20 receives the signals from imaging subsystem 16, specifically pixel array 52, and processes those signals, according to a predetermined program discussed below in detail, to identify at least one condition of the inspected lenses. More specifically, the electric signals from the pixel array 52 of camera 42 are conducted to image processor means 60. The processor means 60 converts each electric current signal from each pixel of array 52 into a respective one digital data value, and stores that data value at a memory location having an address associated with the address of the pixel that generated the electric signal.

Preferably, subsystem 20 is also employed to coordinate or control the operation of subsystems 14 and 16 so that light source 36 is actuated and camera 46 is operated in coordination with movement of lenses 74 through system 10. To elaborate, as the pallet enters the inspection area, a pallet sensor detects its presence. Upon receiving this signal, image processor 60 completes any ongoing processes from the previous pallet and then reports those results, preferably to both the PLC controller and the supervisory computer. As the pallet continues moving along the conveyor, a package sensor detects a package and generates a signal. This signal indicates that a lens is in the proper position to be imaged.

Upon receiving a package detect signal, the image processing hardware initiates an image capture and processes the image to the point where a pass/fail decision is made. As part of the image capture, a strobe is also fired to irradiate the lens. Lens pass/fail information is stored until the start of the next pallet, at which time results are reported. If a report is not received—which might happen, for example, if a sensor does not properly detect a pallet—then no further pallet transfers are allowed. The package detect sensor signals a detect for each of the eight packages found on each side of the pallet.

Even more specifically, the image processing boards determine when to image the lenses. Using fiber optic sensors, as the pallet traverses below the camera, each package edge is detected. Upon the detection of each package edge, the strobe fires, and the camera images the contact lens. The image acquisition is initiated by the image processing board by transmitting a grab signal to the camera. After the strobe firing, the stored image is transferred into the memory of one of the processor boards—referred to as the master processor—from the memory of the camera. The group master processor determines which of the other two processor boards—referred to as the slave processors— are free to inspect the image currently being received. The master processor directs where the image should be processed, informing the slave processors which of them should acquire the image data from the video bus. The master processor also monitors the inspection and final results for each image.

After processing a lens image and inspecting for center defects, the two slave processors report to the master processor. The master processor collects this information and then transmits two reports. One report goes to the PLC controlling the motion of the Accept/Reject Robot. It determines the adjudication of each package on the pallet just inspected. The PLC tracks the pallets on a first in, first out manner. The second report goes out to the supervisory computer for passive data collection and analysis by manufacturing control programs and production schedulers.

Any appropriate processing units may be employed in system 10; and, for instance, the processing units 60*a*, 60*b*, and 60*c* may be IP-940 image processor machine vision boards sold by Perceptics Corp.

Host computer 70, which preferably includes a keyboard 70*a* and a video terminal 70*b*, is connected to processor means 60 to display visually data or messages being input into the processor. Monitor 66 is also connected to processor means 60 and is provided to produce video images from the data values stored in the processor means, and monitor 66 may also be used to display inspection results and totals. Preferably, monitor 66 is a high resolution color monitor and is controlled by a Perceptics high resolution display card, the HRD900, which is also connected to image boards 60*a*, 60*b*, and 60*c*. RS232 connectors on the processor boards allow terminal 66 to interact with the processor boards.

More specifically, the system's operator interface is accomplished through Sun host computer 70 and high-resolution monitors 66. The Sun host computer allows connection and communication to the processor boards. The keyboard of the host computer is used to input information to the processor boards and video displays, of the type referred to as windows, on the monitor of the host computer displays results and status messages. The high-resolution monitors display those images captured during operation. Status and results information are also displayed on the high-resolution monitors.

Figure 10:
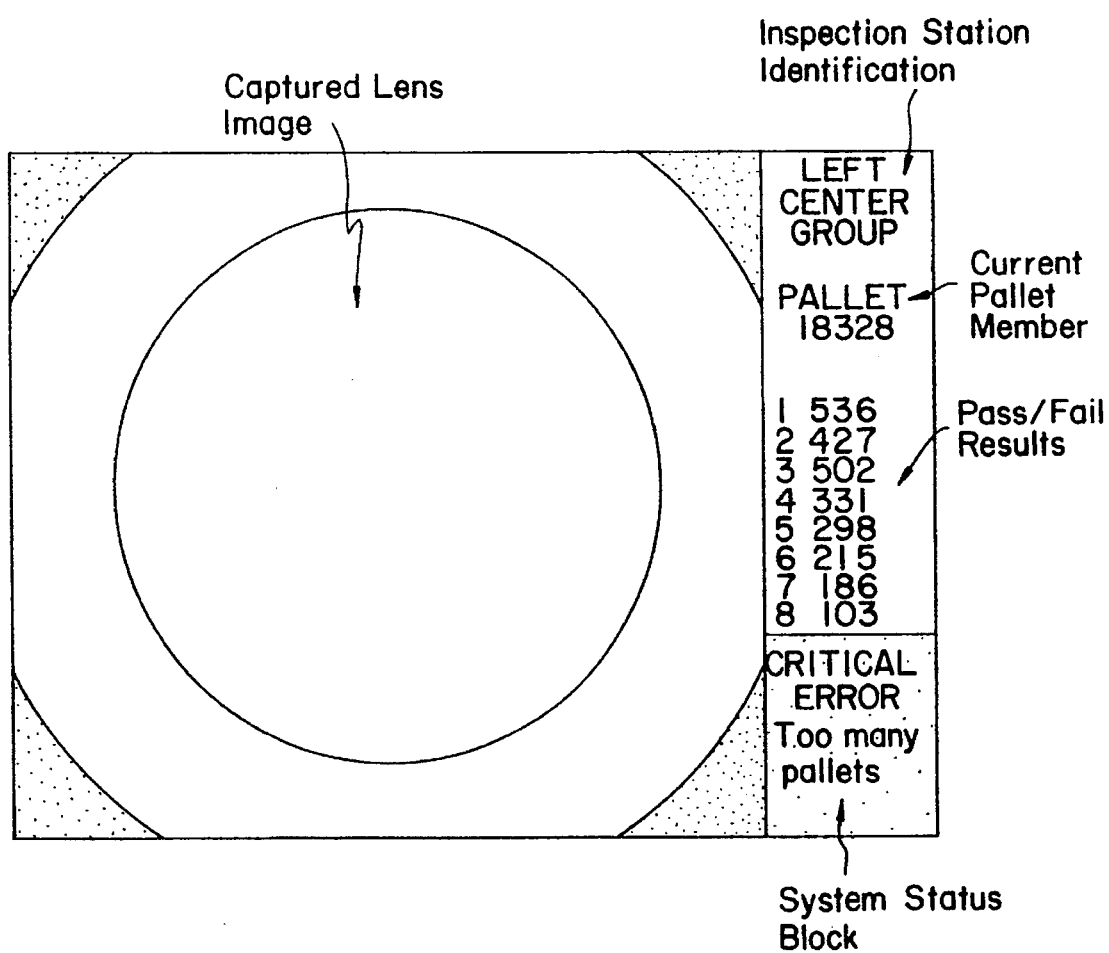
FIG. 10 shows an image of a lens on a monitor of the inspection system.

With reference to FIG. 10, each time a lens is imaged, it will briefly appear on the high resolution monitor, along with an inspection report for the entire pallet. Any error messages, as necessary, may also appear on the high resolution display. The image on the high resolution monitor is broadcast by the high resolution display board, or HRD. This board controls the video bus. It acquires the images from the IP-940 image processor boards and displays either the edge or center image, from the edge or center cameras, respectively, as selected by an operator. Essentially, the HRD board monitors the images as they are processed, and displays them in real time on the monitor, without interfering in the processing of the images.

Figure 11:
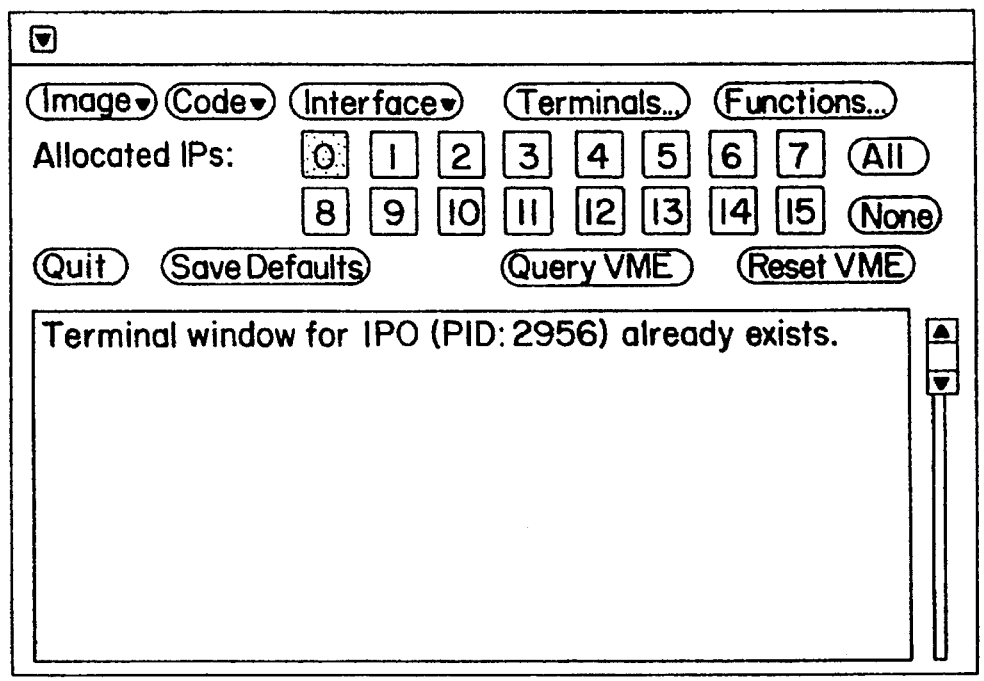
FIG. 11 illustrates a main window of a graphical user interface that may be used to transmit data to the processor means of the inspection system.
Figure 12:
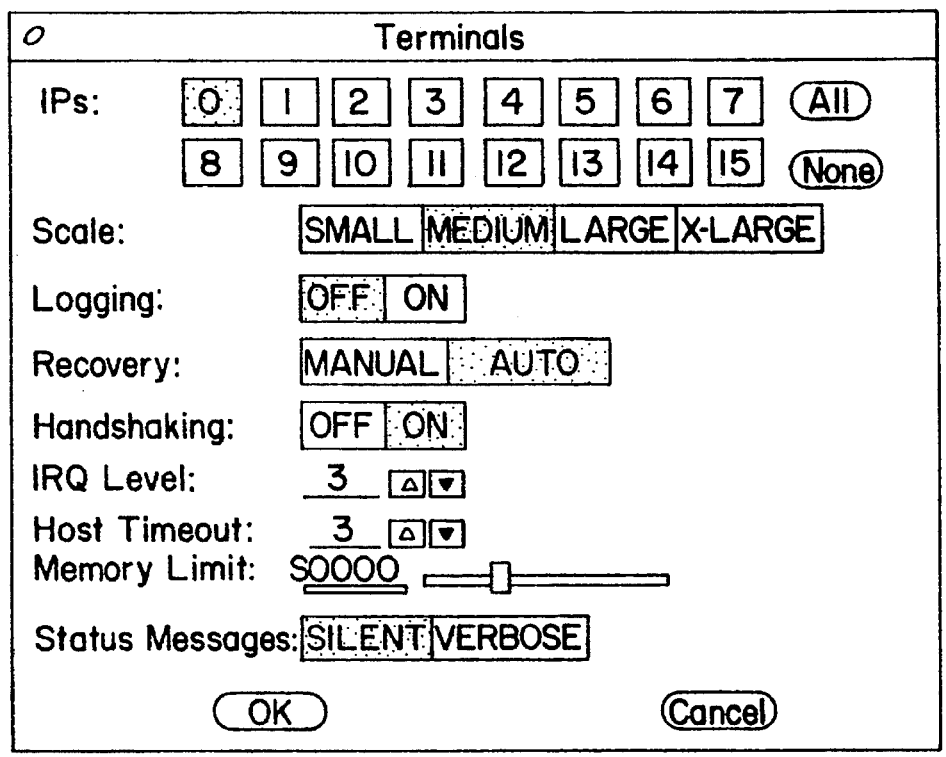
FIG. 12 shows a graphical display window that may be used to transmit data to the processor means.

A graphical user interface may be used to transmit commands and data from an operator to processor means 60. FIG. 11 shows a main window of a graphical user interface, a single screen control mechanism for the processor boards in the system. Preferably, this screen is brought up by entering one command, machinename% ipmgr&, at the host, preferably Sun, command prompt. From this screen terminal, windows can be added or subtracted from the host computer window environment. By selecting the "terminals" button at the top of the ipmgr window, a new window appears, as shown in FIG. 12. This window allows the operator to open a host window for each of the image processor boards. Opening each terminal window is like connecting a dumb terminal to each of the processor boards selected. They may be used for pallet Pass/Fail reports and for debugging or experimental situations.

As will be understood, subsystem 20 may be provided with other or additional input and output devices to allow an operator or analyst to interact with processor boards and controller 24. For example, a printer may be connected to the processor boards to provide a printed record of selected data values or reports transmitted to the printed from the processor board.

Preferably, a printout may be obtained by any of several methods via the host operating system. The screen reports from the master processor may be printed by saving the screen information to a file, and then printing it out at a later time. Also, the printer could be used to print information as it scrolls off of the screen. All of the information on lens disposition is sent concurrently to the supervisory computer, which preferably can assimilate the data and output production reports.

Figure 9:
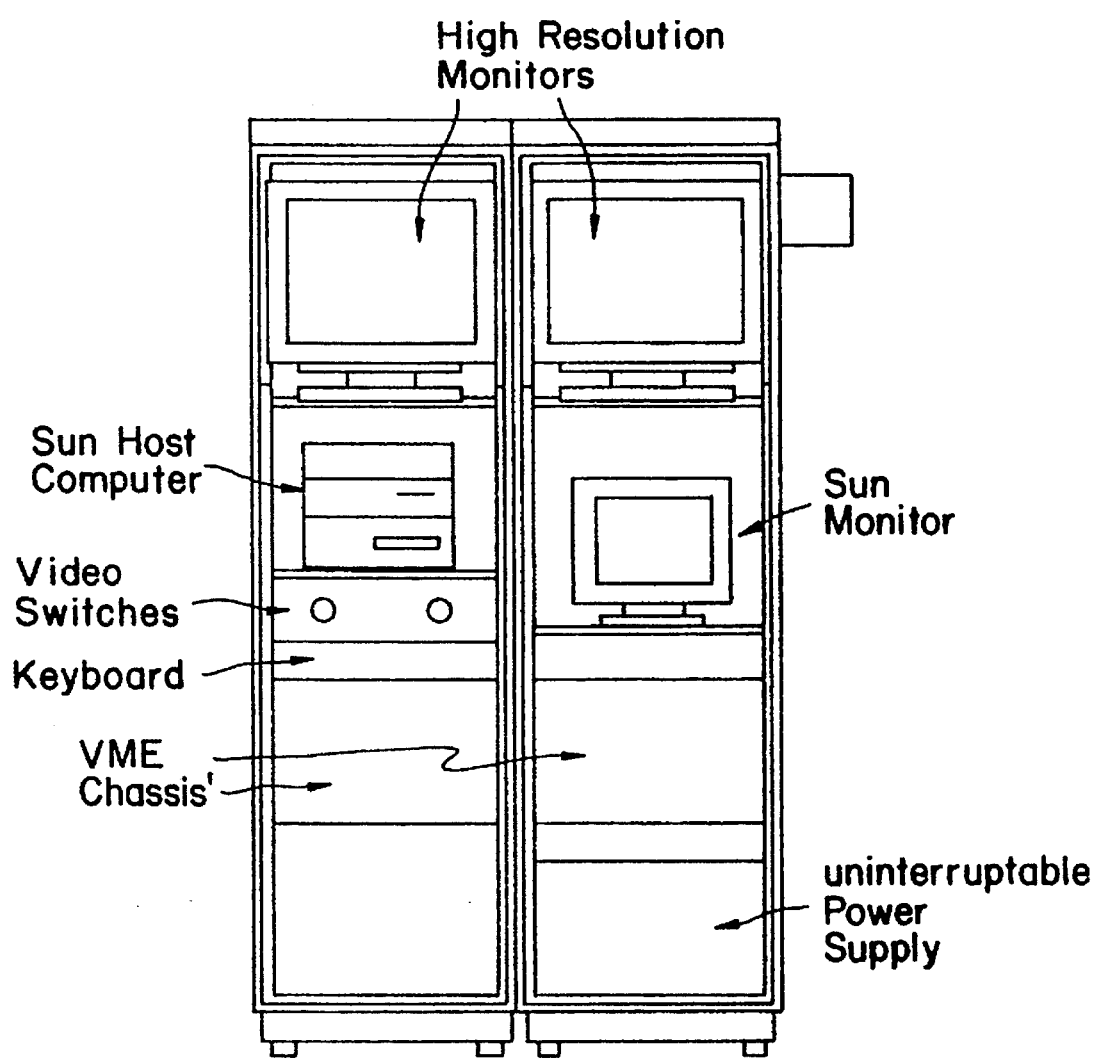
FIG. 9 shows a cabinet housing various components of a processing subsystem of the inspection system of FIG. 1.

With reference to FIG. 9, all image processing hardware, the host computer, monitors, and an uninterruptable power supply are preferably housed in a single cabinet. All cabling found in the system that eventually becomes external to the cabinet first passes through a bulkhead plate.

As discussed above, each time a lens 74 passes through inspection position 72, light is transmitted through the lens and onto pixel array 52, and the pixels of the array generate electric currents representing the intensity of the light on the pixels. These currents are converted to digital data values that are stored in processor means 60, and these data values are then processed, preferably to determine if the lens is suitable for consumer use. The preferred embodiment of the inspection process detects missing lenses, edge chips, edge tears, surface tears, excess pieces, holes, puddles, decentration, and rust, and the process analyzes these features to determine if the lens should be rejected.

Figure 13:
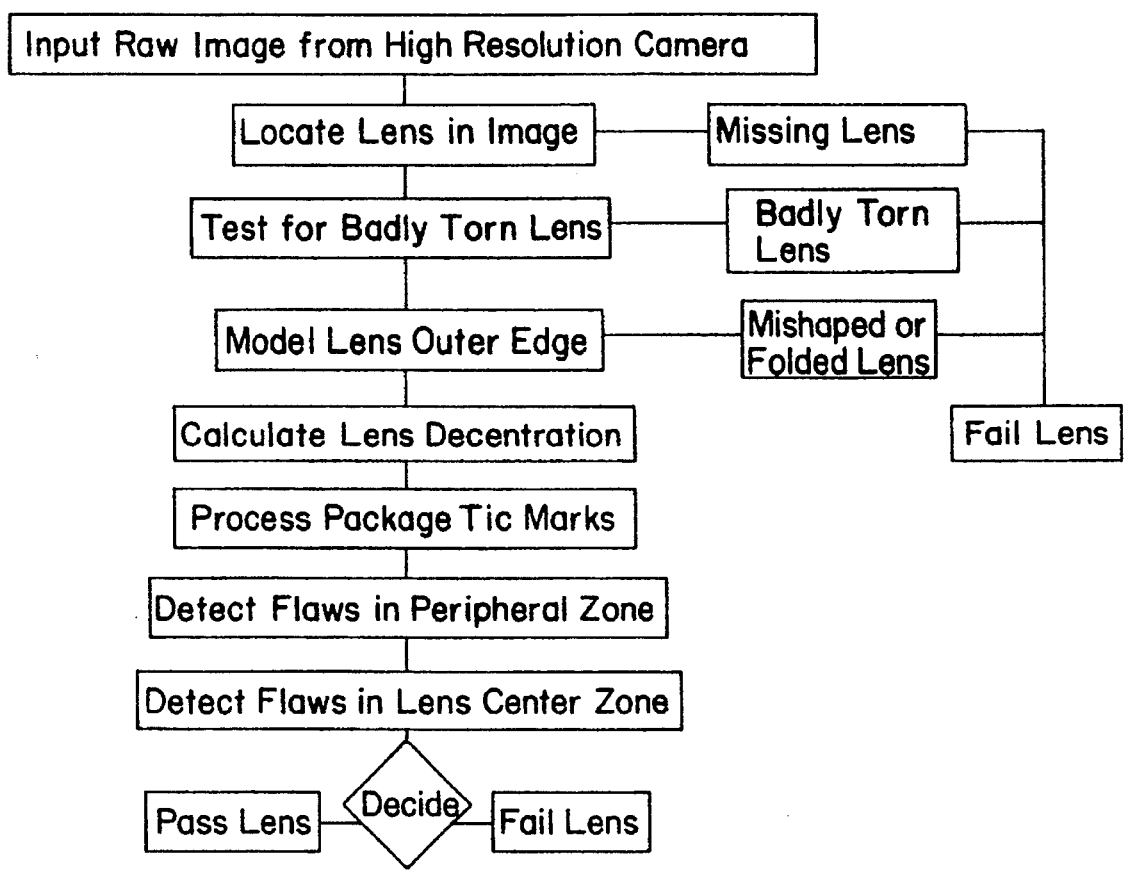
FIG. 13 outlines the major components of a preferred lens inspection process used with the inspection system of FIG. 1.

FIG. 13 shows the major steps of a preferred lens inspection process. The first steps in this process are to locate the lens in the image on the pixel array, to test for a badly torn lens, and to model the outer edge of the lens. If a lens fails at any one of these three steps, then the lens may be automatically rejected. If the lens passes these first three steps, the algorithm determines the lens decentration, processes the package tick marks, and searches for flaws in the peripheral zone and then in the center zone of the lens. If any flaws are detected during these latter steps, then the algorithm determines whether the lens is acceptable or should be rejected.

Locate Lens in Image

The initial step in the lens inspection process, subsequent to input of the raw image, is to determine the location of the lens within the field of view. One difficulty with prior art procedures is the misclassification of badly torn or fragmented lenses as missing lenses. Classification of a lens fragment as a missing lens may cause difficulties in case the deionized water is removed from carrier cavity 86 after the lens inspection. For example, if a large lens fragment is never recognized in cavity 86, that lens fragment might clog an exit vent in a water removal nozzle, diminishing transfer efficiency.

System 10 solves this problem because it not only finds lenses, but also finds fragments of lenses, and classifies them as fragments in order that the packages containing them can be manually handled. If a large lens fragment is located within a package, the inspection system signals the controlling PLC 24 to stop the transport subsystem 12 and alerts an operator to remove the lens fragment from the package.

Generally, the image formed on pixel array 52 is searched for image objects, which could be images of lenses or fragments, by using horizontal and vertical search vectors. The search vectors analyze the image gradients according to equation (1).

$$G=|(P_{i-1,j+1}+2P_{i,j+1}+P_{i+1,j+1})-(P_{i-1,j-1}+2P_{i,j-1}+P_{i+1,j-1})| +|(P_{i-1,j+1}+2P_{i-1,j}+P_{i-1,j-1})-(P_{i+1,j+1}+2P_{i+1,j}+P_{i+1,j-1})| \quad (1)$$

The gradient, G, is calculated for each pixel along the search vector. If the calculated gradient magnitude meets or exceeds a specified threshold, defined by a parameter "E_findThr," a lens has potentially been found. Equation (1) is formed by the taking the absolute values of the x and y Sobel operators. Unlike the usual operation involving total image convolution, this modified Sobel only marches along the search vector direction. Also the gradient magnitude, G, is all that equation (1) determines. It is insensitive to the direction, or the sign, of the gradient. This makes the detection of edges more sensitive, in that both positive and negative edge gradients may be detected. Moreover, equation (1) may be used for both the horizontal and vertical edge detection search vectors. The edge detection search vectors preferably cover at least 50% of the image area.

Figure 14:
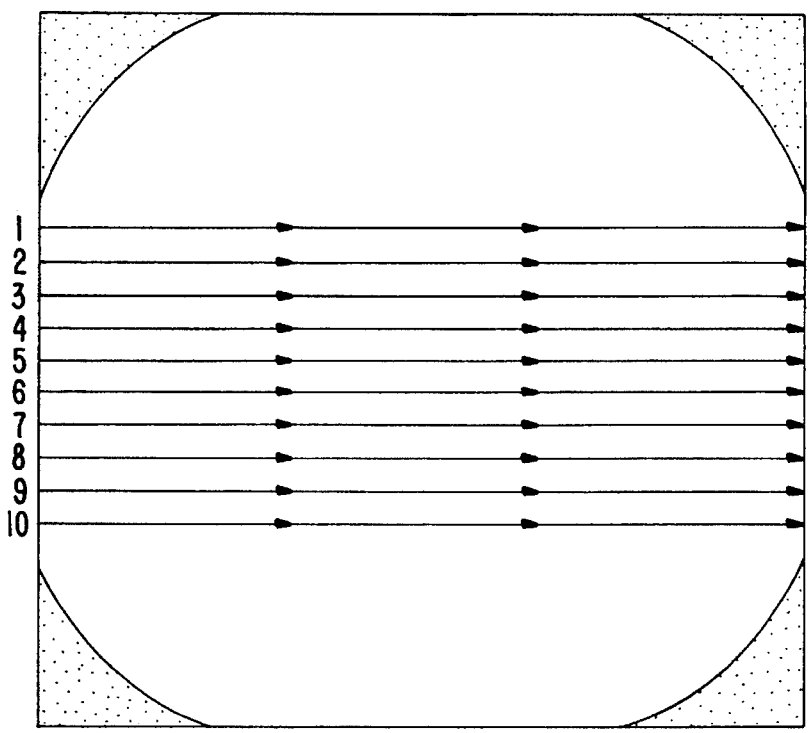
FIGS. 14 and 15 show vectors that may be searched to find a lens in an image.
Figure 15:
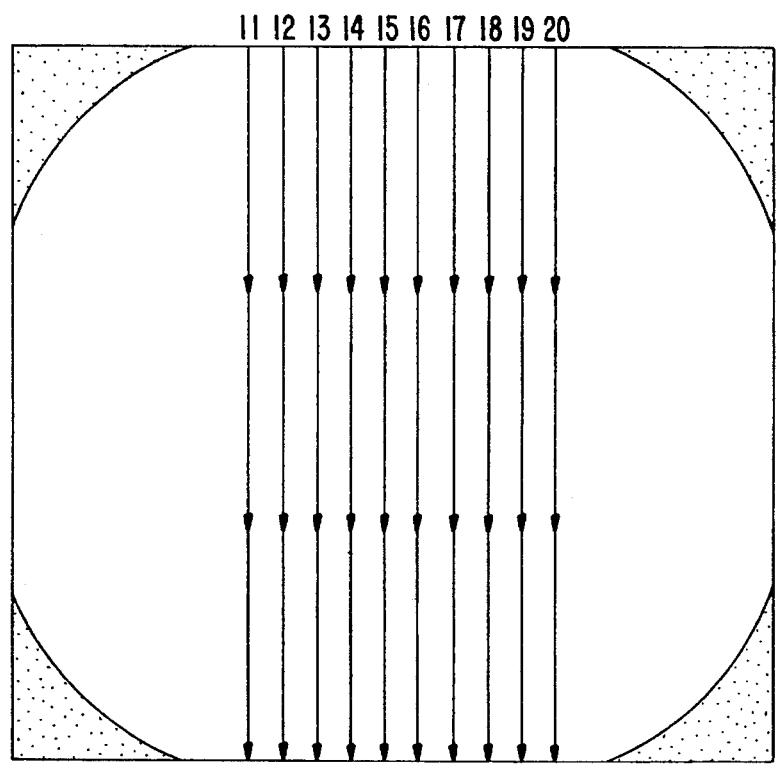

More specifically, with reference to FIGS. 14 and 15, preferably a series of ten horizontal and ten vertical search vectors are potentially traversed. These vectors are spaced apart equal distances from each other and the location of all vectors is such that they avoid the dark areas found in the four corners of an image. The order in which search vectors are traversed is shown in FIGS. 14 and 15. Direction is indicated by the arrows and order is indicated by the number next to the vector.

These vectors are searched according to this predefined order until a lens is located or until all vectors have been traversed. If a lens is located, preferably no further searching is performed along the search vectors. A normal lens, for example, may be found while searching along the first search vector, while it may be necessary to search along most of the search vectors in order to find a badly torn lens.

After initially locating an object, a secondary test is conducted to verify lens detection. This verification test tracks the contour of the object just found. Any suitable connectivity procedure may be used to do this, and for instance, the edges may be tracked using a technique that may be referred to as eight connectivity analysis. In this technique, when a first pixel is found that is on an edge of a particular object, the eight immediate pixel neighbors of that pixel are searched, in a uniform direction, for a second edge pixel. If a second edge pixel is found, it is considered to be on the edge of the particular object, and, also, the process is repeated and the eight immediate neighbors of this second edge pixel are searched, in the uniform direction, for a third edge pixel. This process is repeated—a procedure referred to as tracking the edge or tracking the object— until an end of the edge is found, a predetermined number of edge pixels are encountered before the edge returns to its original pixel, or the edge formed by these identified edge pixels forms a closed loop, and more specifically, that edge returns to the first edge pixel of the particular object.

Figure 16A:
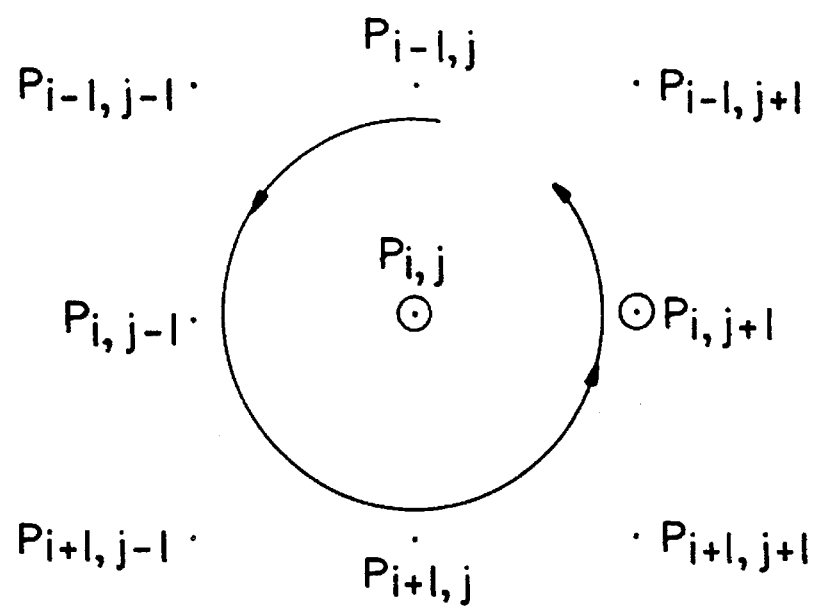
FIGS. 16A and 16B illustrate a pixel searching technique used in the preferred processing procedure.
Figure 16B:
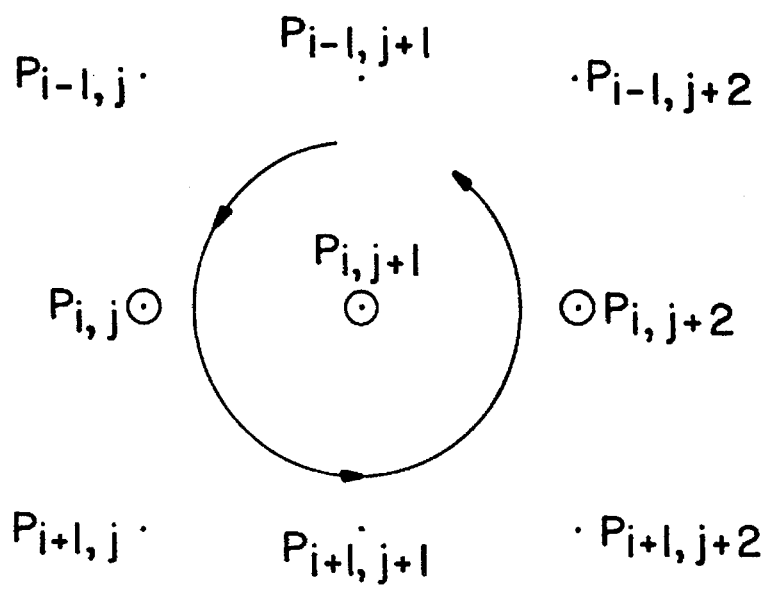

FIGS. 16A and 16B illustrate this eight connectivity analysis in greater detail. In FIGS. 16A and 16B, each pixel is represented by a point, to better illustrate the search around each pixel. FIG. 16A shows a first pixel, $P_{i,j}$, that has been identified as being on an object edge. The eight immediate pixel neighbors are searched, in a counterclockwise direction starting from the pixel immediately above $P_{i,j}$, for a pixel that has a grey level above a predetermined threshold. The first pixel that is found that meets this test is considered as the next edge pixel, which in the example of FIG. 16A is pixel $P_{i,j+1}$.

At the next step, illustrated in FIG. 16B, the eight immediate pixel neighbors of $P_{i,j+1}$ are searched— again, in a counterclockwise direction starting from the pixel immediately above $P_{i,j+1}$—for a pixel that (i) has a grey level above the predetermined threshold, and (ii) was not the pixel at the center of the immediately preceding search. The first pixel that is found that meets this test is considered as the next edge pixel; and in the example shown in FIG. 16B, that next edge pixel is $P_{i,j+2}$. This tracking process continues until the search returns to pixel $P_{i,j}$, a predetermined number of contour pixels have been encountered before the contour returns to its starting location, or a search around a given pixel fails to identify any next edge pixel.

Preferably, gradient magnitude is used during this tracking procedure to determine those pixels on and external to the object's contour. Calculation of gradient magnitude is identical to that used by the search vector routines and is defined by Equation (1). The threshold value used during this tracking is also identical to the one used by the search vectors and is specified by the parameter "E_findThr."

Figure 17A:
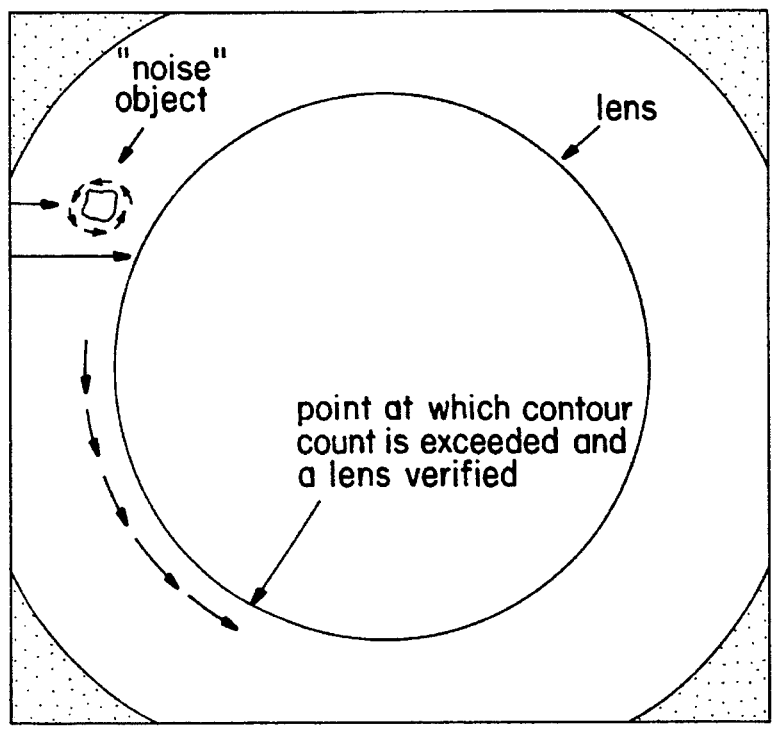
FIGS. 17A and 17B show examples of lens searches that locate a noise object before locating the lens.
Figure 17B:
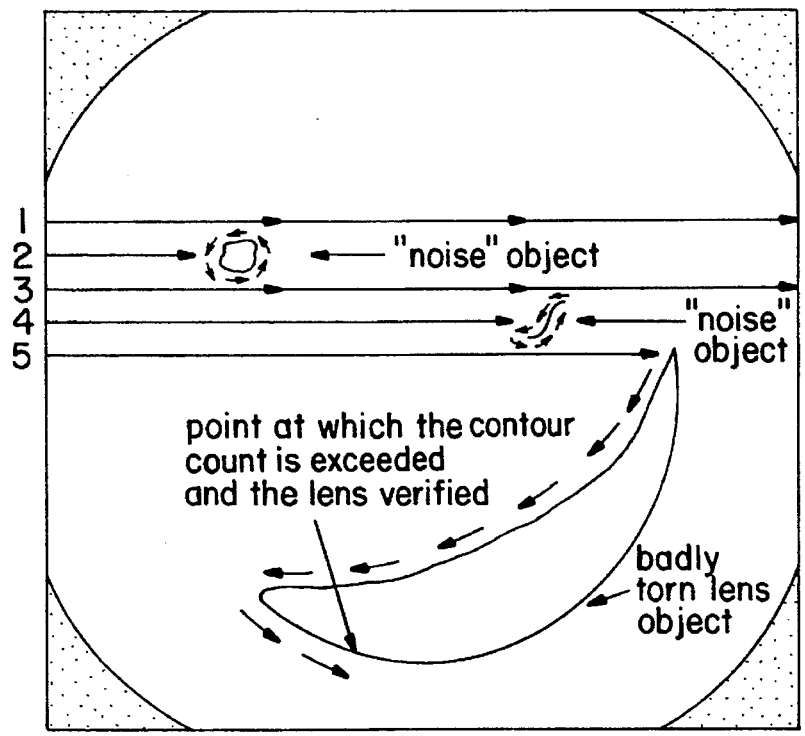

If, during tracking of the object, its contour starting location is not encountered before a specified number of contour pixels have been tracked, a lens object is considered verified. If, however, the starting location is encountered before that specified number of contour pixels is reached, the object is not considered to be a lens, and is referred to as noise. The minimum lens contour length used during this verification test is given by the parameter "B_cont_cnt." If a noise object is encountered while searching along one vector, no further searching is performed along that one vector, and processing continues on the next search vector. This procedure is repeated until a lens has been found or until all search vectors have been tried. FIG. 17A shows an example of a hypothetical lens detect search that finds a noise object before locating the lens, and FIG. 17B shows an example of a hypothetical lens detect search that finds two noise objects before locating a badly torn lens.

If a lens is not found after trying all search vectors, the lens is determined to be missing. This result is reported and further processing is aborted. If a lens is found, the image coordinates that originally detected the lens are retained and further processing is continued.

Two further tests may be performed before the morphological features of the object are analyzed to determine if the object is a badly torn lens. First, if while tracking around the object, tracking runs off the outer boundary of the image memory, then the lens candidate is partially out of the field of view and the lens candidate is failed. In this case no further processing is attempted or performed on the image. Second, if while tracking around the object, a maximum number of contour pixels is exceeded, then the lens candidate is too large to be a single lens and the lens candidate is failed.

Test for Fragmented or Badly Torn Lens

Thus, at this point, if processing is to continue, the lens candidate is either a badly torn lens or a whole lens. If the starting location of a lens candidate is encountered during tracking, then the object is considered to have been traversed along its entire outer dimension. The morphological tests for a badly torn lens are triggered, or initiated, by either the condition of encountering the starting pixel, or the condition of exceeding the maximum number of contour pixels.

The preferred embodiment of the algorithm employs two main tests, referred to as elongation and bounding box size, to determine if an object is a badly torn lens. The elongation test is primarily designed to identify lenses having large segments removed or missing, so that the lens no longer approximates a circular object with a unitary eccentricity. The bounding box test provides a check on the elongation test, and in particular, is used to identify badly torn lenses that are somewhat circular.

Both of the above-discussed tests use coordinate information obtained from tracking the entire contour of the lens. The tracking technique is identical to that used to verify lens detection. The tracking process uses gradient magnitude, as defined in Equation (1), to determine if a pixel is on or external to the lens contour. Eight connectivity analysis is used to track along the lens contour, and the gradient magnitude threshold is specified by the parameter "C_findThr."

As tracking is performed, a sequential record of the row and column locations of each pixel in the contour is maintained. Contour tracking continues until one of three events occurs: 1) tracking runs off image memory, 2) the maximum allowable number of contour pixels is exceeded, or 3) the starting location of the lens contour is encountered.

If tracking runs off image memory, the lens is considered to be partially outside the image field of view and the lens is failed. The result is reported and further processing is aborted. If the starting location of the lens is encountered, or if the maximum allowable number of contour pixels is exceeded, then the morphological features referred to as elongation and boundary area or bounding box are extracted to determine if a badly torn lens is present.

The elongation value of an object is given by Equation (2):

$$\text{Elongation} = \left[ \frac{\text{moment of inertia about principal axis}}{\text{moment of inertia about minor axis}} \right] \quad (2)$$

The elongation test also provides a measure of an object's maximum moment of inertia divided by its minimum moment of inertia. The more disproportionate the longest to shortest dimensions of an object, the larger the elongation value; and the more compact an object, the smaller its elongation value. For example, a circle shaped object has the smallest theoretical elongation value, while a rod or line-shaped object would have a relatively large elongation value.

In order to calculate elongation, a pass is made over the coordinate data for all contour pixels. From this pass, horizontal and vertical moments of inertia are calculated. Equations (3) and (4) show the calculations involved for these moments.

$$\begin{aligned}\text{vertical moment} \\ \text{of inertia}\end{aligned} = abs(\Sigma(x_i - x_{avg})^2) \quad (3)$$

$$= abs(\Sigma x_i^2 - ((\Sigma x_i)^2/\text{contour count}))$$

where;

$x_i$=the column coordinate of the $i^{th}$ pixel found along the lens' outer contour. Summation occurs over all pixels found on the lens' contour.

x avg=the object's column centroid $$\text{horizontal moment of inertia} = abs(\Sigma (y_i - y_{avg})^2) \quad (4)$$
$$= abs(\Sigma y_i^2 - ((\Sigma y_i)^2/\text{contour count}))$$

where;

$y_i$=the row coordinate of the $i^{th}$ pixel found along the lens' outer contour. Summation occurs over all pixels found on the lens' contour.

y avg=the object's row centroid

From these two pieces of information, the angle at which the object's principal axis lies can be found. This is detailed in Equation (5).

$$\emptyset = \arctan((2*\Sigma(x_i-x_{avg})(y_i-y_{avg}))/(\Sigma (x_i-x_{avg})^2-(y_i-y_{avg})^2))/2 \quad (5)$$

where;

$\emptyset$=the angle, with respect to the object centroid, at which the principal axis lies With the angle of the principal axis determined, a final pass is made over the coordinate data for all contour pixels to calculate, for each such pixel, inertia about the principal and minor axes. Equations (6) and (7) detail these calculations.

$$\begin{aligned}\text{moment of inertia about principal axis} &= abs(\Sigma ((-x_i\sin(\phi) + y_i\cos(\phi)) - x_{avg}')^2) \quad (6)\\ &= abs (\Sigma (-x_i\sin(\phi) + y_i\cos(\phi))^2 - \\ &\quad ((\Sigma(-x_i\sin(\phi) + y_i\cos(\phi)))^2/\\ &\quad \text{contour count}))\end{aligned}$$

where;

$x_i$=the column coordinate of the $i^{th}$ pixel found along the lens' outer contour. Summation occurs over all pixels found on the lens' contour.

$y_i$=the row coordinate of the $i^{th}$ pixel found along the lens' outer contour. Summation occurs over all pixels found on the lens' contour.

x'avg=the object's centroid along the principal axis.

$$\begin{aligned}\text{moment of inertia about minor axis} &= abs(\Sigma ((x_i\cos(\phi) + y_i\sin(\phi)) - y_{avg}')^2) \quad (7)\\ &= abs (\Sigma (x_i\cos(\phi) + y_i\sin(\phi))^2 - \\ &\quad ((\Sigma(x_i\cos(\phi) + y_i\sin(\phi)))^2/\\ &\quad \text{contour count}))\end{aligned}$$

where;

$x_i$=the column coordinate of the $i^{th}$ pixel found along the lens' outer contour. Summation occurs over all pixels found on the lens' contour.

$y_i$=the row coordinate of the $i^{th}$ pixel found along the lens' outer contour. Summation occurs over all pixels found on the lens' contour.

y'avg=the object's centroid along the minor axis.

Elongation is then calculated as described in Equation (2). The calculated elongation value is compared to the value specified by the parameter "C_elong" to determine if the lens is badly torn or not. If, for example, that calculated elongation value is greater than "C_elong," then the lens is considered badly torn and is failed, and further processing is aborted.

Figure 18:
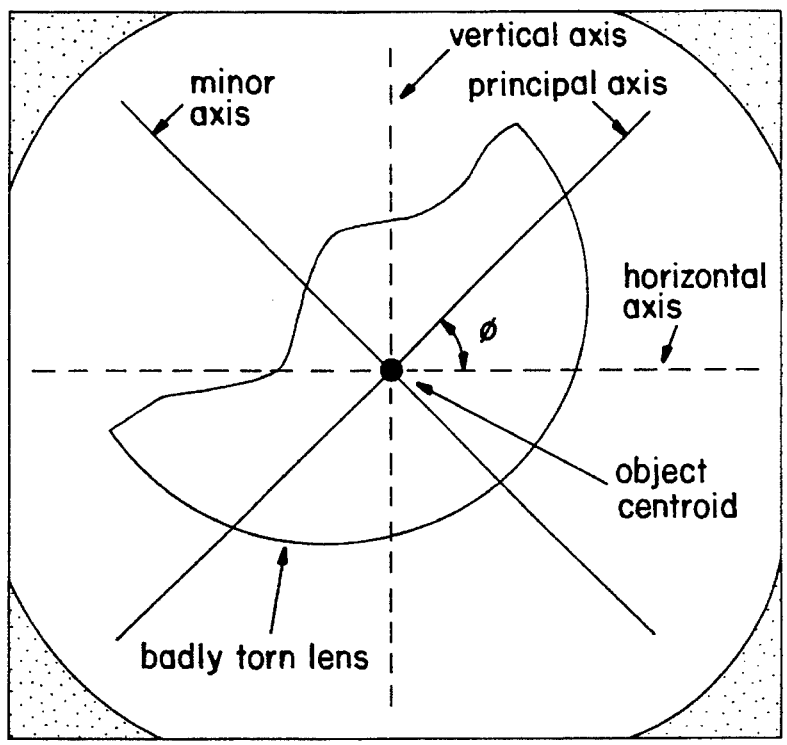
FIGS. 18 and 19 illustrate several features that may be used to determine whether a lens is badly torn.

FIG. 18 shows some of the terminology involved with the elongation feature.

Figure 19:
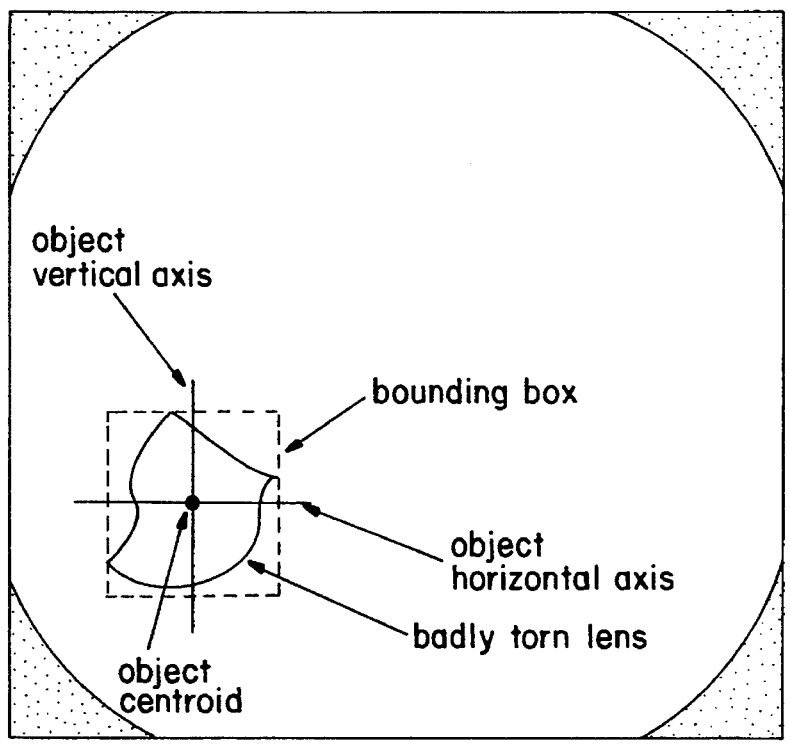

A bounding box feature is also calculated for the lens object. Generally, the bounding box is a box just large enough to hold the lens candidate based upon the maximum and minimum vertical and horizontal axes of the object. It has been found that such a box serves as a close approximation to the actual object area of the lens candidate. This test is employed to identify badly torn lenses that might not be identified by the elongation test. To elaborate, a badly torn lens could be so distorted that it could actually appear somewhat circular, and thus not be identified by the elongation test. The bounding box test utilizes the characteristic that a badly torn but somewhat circular lens, is substantially smaller than a normal size lens. The box is oriented along horizontal and vertical axes which pass through the object's centroid. FIG. 19 shows the concept of the bounding box test, and Equation (8) defines this test.

Bounding Box=(right most column in object−left most column in object) * (bottom most row in object−top most row in object)(8)

The calculated bounding box value is compared to the value specified by the parameter "C_bdbox." If, for example, that calculated value is less than "C_bdbox," then the lens is considered badly torn and is failed, and further processing is aborted.

Model Lens Outer Edge

Figure 20:
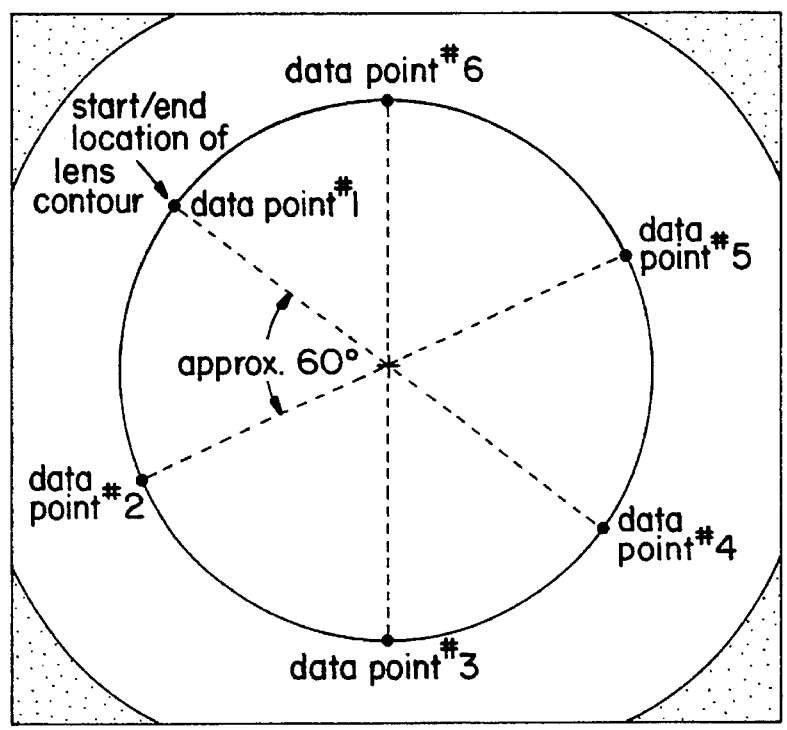
FIG. 20 schematically illustrates points on a lens edge that may be used to determine a model for that edge.

If the lens candidate passes both the elongation and bounding box size requirements, then a second technique for detection of badly torn lenses is performed. With reference to FIG. 20, six circular models are defined from the object tracking data, using six data points on the object edge and approximately 60 degrees apart. Each set of three consecutive data points is used to define a unique circle. The sets are data points {1,2,3}, {2,3,4}, {3,4,5}, {4,5,6}, {5,6,1}, and {6,1,2}. The circular model having the radius that most closely matches the radius defined by the parameter B_lens_dia, is used as the lens outer edge model.

Preferably, for each circular model, the data points used to define the circle are first checked to ensure that they are not too close to each other. It is possible for this to occur if a lens contains a tear that prevents the contour from being continuous for the entire 360 degrees of a lens. A data set that contains data points that are too close to each other may inadvertently result in an erroneous model and is, preferably, ignored.

Figure 21:
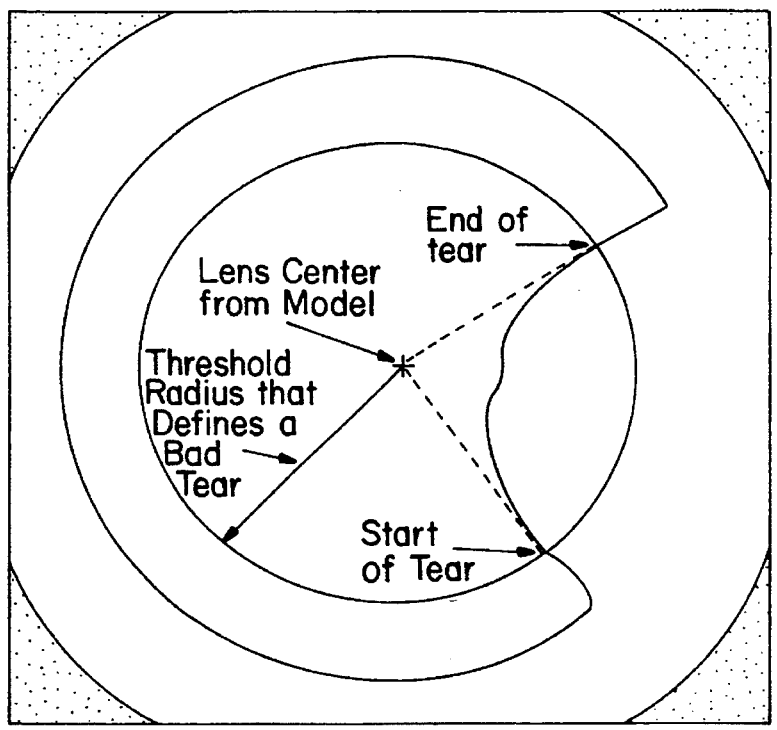
FIG. 21 shows the concept of using radial deviation as a technique for determining angular tear spans for a lens.

Each pixel along the contour of the lens candidate is compared to the theoretical model used as the lens edge. Using a rectangular to polar coordinate look up table, each contour pixel is restated by using radius and angular displacement around the edge. If the value for the radius to any pixel is less than 90% of the radius of the circular model used as the lens edge, then the pixel is considered to be part of a large tear. Each group of pixels considered to be part of a common tear are measured in units of degrees. If the start and stop points of the tear demonstrate that the tear is larger than the parameter C_badtear, then the lens is considered badly torn and failed. FIG. 21 illustrates the concept of using radial deviation as a technique for determining tear spans for a lens.

In the event the contour of the lens is not continuous all the way around the lens, the algorithm marks the start and stop points of a tear by determining when the tracking along that Contour reverses directions— a condition referred to as doubling back. When a first doubling back condition is sensed, that location is marked as the starting point of a tear.

At this point, tracking has reversed directions and is following the inner side of the lens contour. Since it is not possible to reencounter the original discontinuity point from the other side of the lens, it can be inferred that the next doubling back condition detected is the opposite side of the tear that is causing the discontinuity.

Figure 22:
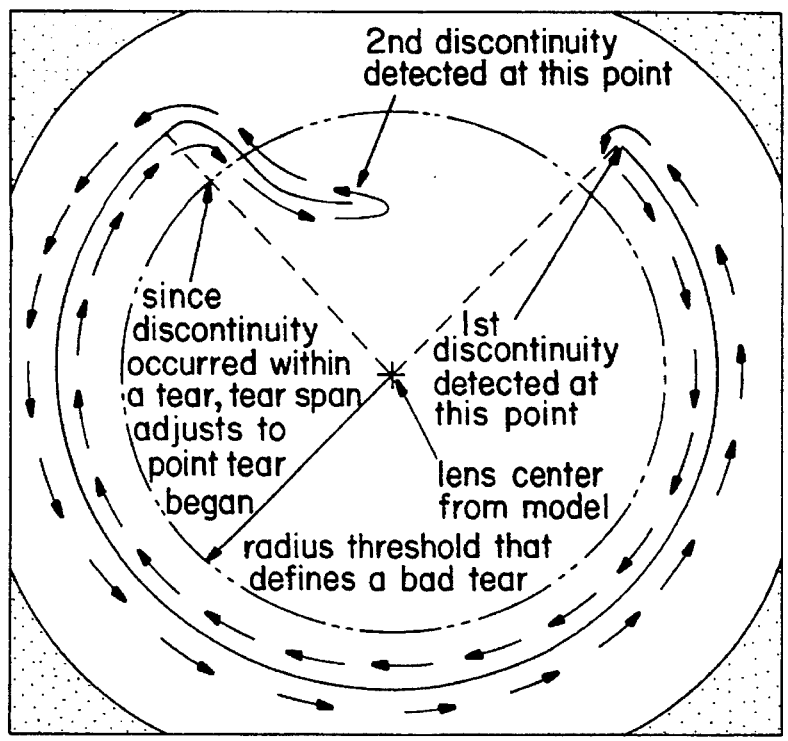
FIG. 22 shows graphically a technique for determining tear severity for a lens that has a discontinuous contour.

This technique is used to solve the problem of determining the severity of a tear in a lens that has a discontinuous contour. FIG. 22 shows graphically the concept involved with this portion of the algorithm. If a discontinuity occurs within a tear, the span of the tear is adjusted to include the portion of the lens between the point at which the tear began and the discontinuity. This produces a more accurate representation of tear severity.

If a lens has not been failed for running off the image memory space during tracking, or for exceeding the maximum number of contour pixels, elongation, or bounding box size limits, the lens is considered to be whole. As FIG. 13 shows, the lens has not yet been classified as passed, but at this point the lens has been found and identified to be of acceptable quality for further processing of the inspection image. The next step is to test for decentration.

Decentration

A lens with a decentration that allows for a peripheral zone width of, for example, 0.270 mm or smaller may be deemed to be unacceptable. Since the lenses are inspected in deionized water instead of the saline packing solution, the lenses have not yet expanded to their full and ultimate size. As a first approximation, the peripheral zone can be considered as part of an isotropic media. This is predicated upon the basis that, as the lens expands when the deionized water is replaced with the saline packing solution, the expansion of the lens in the radial direction, i.e. the increase in the width of the annular band, is the same as the increase of the diameter of the entire lens.

The relationship between the width of the peripheral zone of a lens in the final packing solution and the width of that zone in deionized water steady state conditions, may be expressed as follows:

$$PZ_f = PZ_w(1+\xi) \quad (9)$$

where:
$PZ_f$ is the peripheral zone width in the final packing solution,
$PZ_w$ is the peripheral zone width in the deionized water steady state, and
$\xi$ is a linear expansion factor.

$\xi$ can also be expressed in terms of the final diameter, $D_f$, of an expanded lens in packing solution and the diameter, $D_w$, of the lens in its steady state during inspection while in deionized water as follows:

$$\xi = \frac{D_f - D_w}{D_w} \quad (10)$$

For example, a lens may have a final design diameter, $D_f$, of 14.200 mm, and a steady state diameter in deionized water, $D_w$, of 895 pixels, or 12.670 mm. Using equation (10), the linear expansion factor, $\xi$, for this lens equals 0.12076. Substituting this value for $\xi$ in equation (9), yields equation (11).

$$PZ_f = PZ_w(1.12076) \quad (11)$$

With one type of lens that system 10 has been used to inspect, the lens has an outside diameter of 14.200 mm, and the back optical zone of the lens has a diameter of 13.000 mm. The total linear distance consumed by the peripheral curve is the difference of these two values, or 1.200 mm, and the width of the peripheral zone, $PZ_f$ of the lens equals half that value, or 600 microns. Rearranging equation (11) to determine $PZ_w$, and then substituting 600 microns for $PZ_f$ in the equation, yields:

$$PZ_w = \frac{PZ_f}{1.12076} = \frac{600 \, \mu m}{1.12076} = 535 \, \mu m \quad (12)$$

Thus, using a first approximation to the width of the peripheral zone, the width of $PZ_w$ is estimated to be 535 microns. In actual practice, however, the width of $PZ_w$ is 580 microns. Thus, the model underestimates the actual width of the peripheral zone by about 8 percent. This could be due, for example, to nonlinear expansion of the lens in the final packing solution, or to the fact that the molds, in which the ophthalmic lenses are made, have a different target dimension for the optical zone diameter.

The preferred embodiment of the algorithm used in system 10 rejects any lens that has a peripheral zone width less than 332 μm. The parameter C_minPZdist has the value of 332, and is the minimum peripheral zone width.

Figure 23:
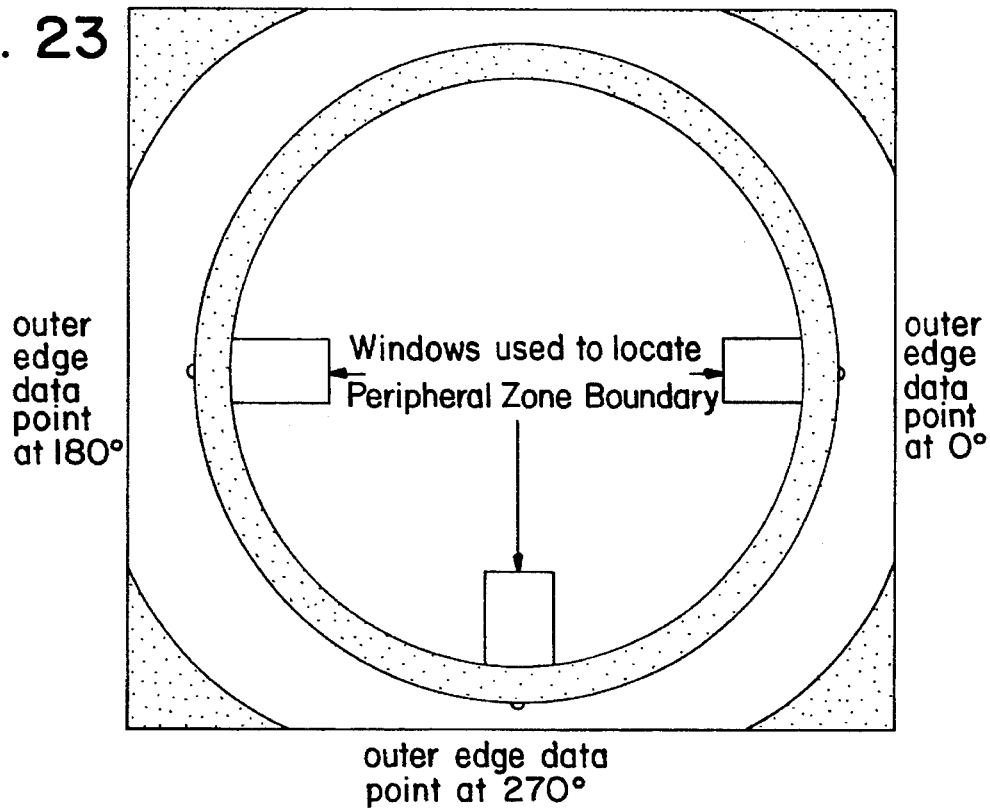
FIG. 23 illustrates three windows that may be used to identify the junction between the peripheral and optical zones of a lens.

In order to determine decentration of a lens, a comparison is made between the outer edge of the lens and the Peripheral Zone/Center Zone edge. It is expected that both edges are circular and that localized deviations in the edges are not relevant to a final decentration determination. The circular model determined during the Lens Find operation is used to characterize the outer edge of the lens. Then, three data points are extracted on that model of the lens outer edge at approximately 0, 180, and 270 degrees. These data points are used as references for the location of three windows. The windows are located interior to the model of the lens outer edge and are used to find the Peripheral Zone/Center Zone boundary. FIG. 23 shows the location of these three windows.

Within each of the windows, a large one dimensional edge operator is performed, and FIGS. 24 and 25 show the gradient masks used to enhance vertical and horizontal edges respectively. Specifically, the windows at 0 and 180 degrees use the vertical edge mask described in FIG. 24, and the window at 270 degrees uses the horizontal edge mask described in FIG. 25.

Figure 26:
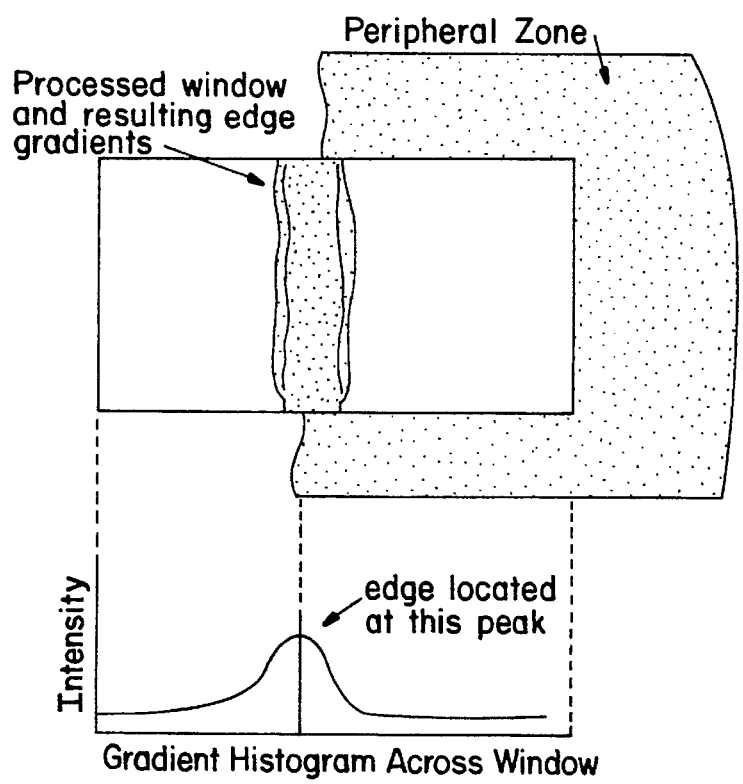
FIG. 26 illustrates a gradient histogram used to identify the junction between the peripheral and optical zones.

Next, a measure of edge strength along the length of the windows is made. For the windows at 0 and 180 degrees, each column has an edge strength associated with it. A summation of gradient values for the column being processed and the columns on either side of that column is compiled for each column in the window. A pass is then made over all these edge values to determine which column contains the greatest edge strength. FIG. 26 shows a representation of a processed window and the resulting edge strength histogram.

For the windows at 0 and 180 degrees, this peak column found from the histogram is considered to define the Peripheral Zone/Center Zone boundary. The row centers of the windows are the corresponding row coordinates that defines the two data points on the Peripheral Zone/Center Zone boundary. Equations (11) and (12) show the histogram compilation and analysis in equation form.

$$\text{column edge strength}[j] = \Sigma(\text{gradient magnitudes})_{j-1} + \quad (11)$$
$$\Sigma(\text{gradient magnitudes})_j +$$
$$\Sigma(\text{gradient magnitudes})_{j+1}$$

where;

$j$=the column being processed gradient magnitude=the gray-level result of the edge enhancement operator boundary column=maximum value of column edge strength [j] array for all values of j (12)

From a conceptual standpoint, the processing in the window at 270 degrees is identical to the processing in the other two windows. However, for the window at 270 degrees, the edge of interest is horizontal instead of vertical, and hence all operations are essentially rotated by 90 degrees. The window dimensions are rotated, the horizontal edge mask is used, a row by row edge strength histogram is compiled and the row value of the Peripheral Zone/Center Zone boundary is the final result. The column center of the window is the corresponding column coordinate that defines a data point on the Peripheral Zone/Center Zone boundary. Equations (13) and (14) show this analysis in equation form.

$$\text{row edge strength}[i] = \Sigma(\text{gradient magnitudes})_{i-1} + \Sigma(\text{gradient magnitudes})_i + \Sigma(\text{gradient magnitudes})_{i+1} \quad (13)$$

where;

i=the row being processed gradient magnitude=the gray-level result of the edge enhancement operator boundary row=maximum value of (row edge strength [i]) for all values of i (14)

With these three Peripheral Zone/Center Zone boundary data points, a circular model is calculated.

The angle of the axis upon which the minimum and maximum decentration occurs is calculated from the displacement of the lens' outer edge model center and the Peripheral Zone/Center Zone model center. This relationship is described in equation (15).

$$\text{decentration axis angle}=\arctan(((\text{row center})_{lens}-(\text{row center})_{PZ/CZ})/((\text{column center})_{PZ/CZ}-(\text{column center})_{lens})) \quad (15)$$

Figure 27:
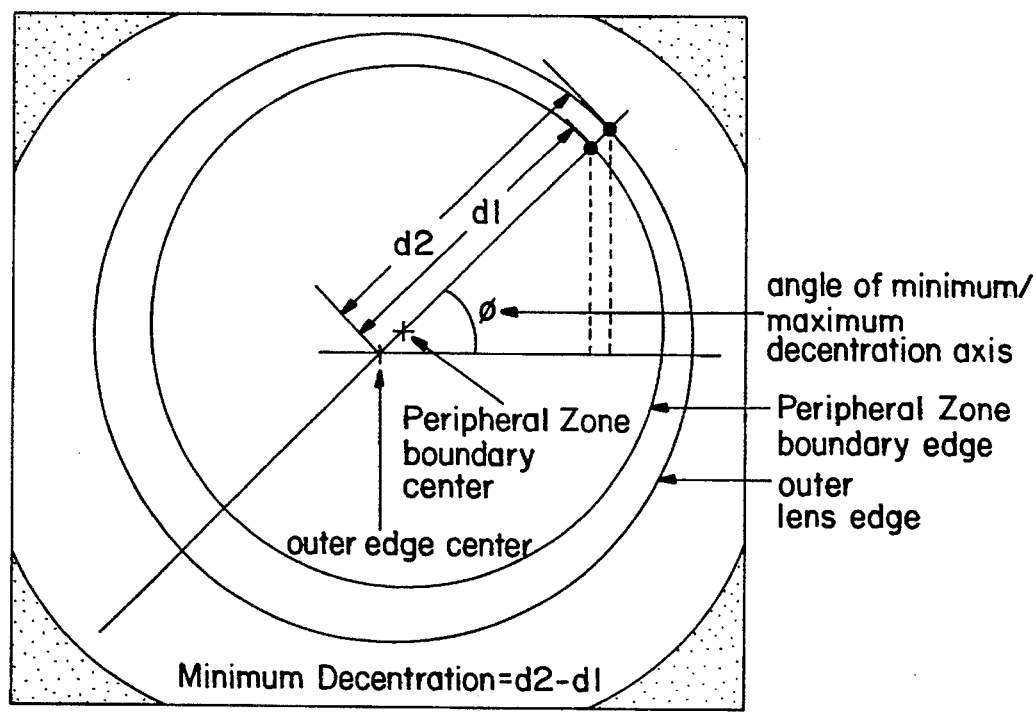
FIG. 27 shows a geometric relationship used in the decentration calculation.

Once this angle is determined, the rows and columns of points on the Peripheral Zone/Center Zone model and on the lens outer edge model are calculated at that angle. Distances from these two points to the lens' outer edge model are then calculated. The difference in these two distances becomes the minimum decentration value. If the value turns out to be smaller than the minimally accepted distance specified by the parameter "$C_{13}$ minPZdist," the lens is failed due to decentration. FIG. 27 shows the geometric relationship of the decentration calculation.

Tic Marks

If the lens has passed the decentration test, then the area of the package used for frictional adhesion during water removal, known as the tic marks zone, or TMZ, is processed. The purpose of the TMZ processing is to blend the generally lower intensity of the TMZ into the average intensity profile surrounding the center zone, or CZ. Once the TMZ has been blended into the CZ, the entire CZ can be processed for irregularities. The technique used for blending the TMZ into the CZ is preferably conducted in such a way as to retain object information within the TMZ. Alternatively, the TMZ could be evaluated separately from the rest of the CZ for irregularities indicative of the presence of a flaw in the TMZ. However, it is preferred to blend the TMZ into the CZ, and then to inspect the entire CZ at one common flaw intensity threshold.

Figure 28:
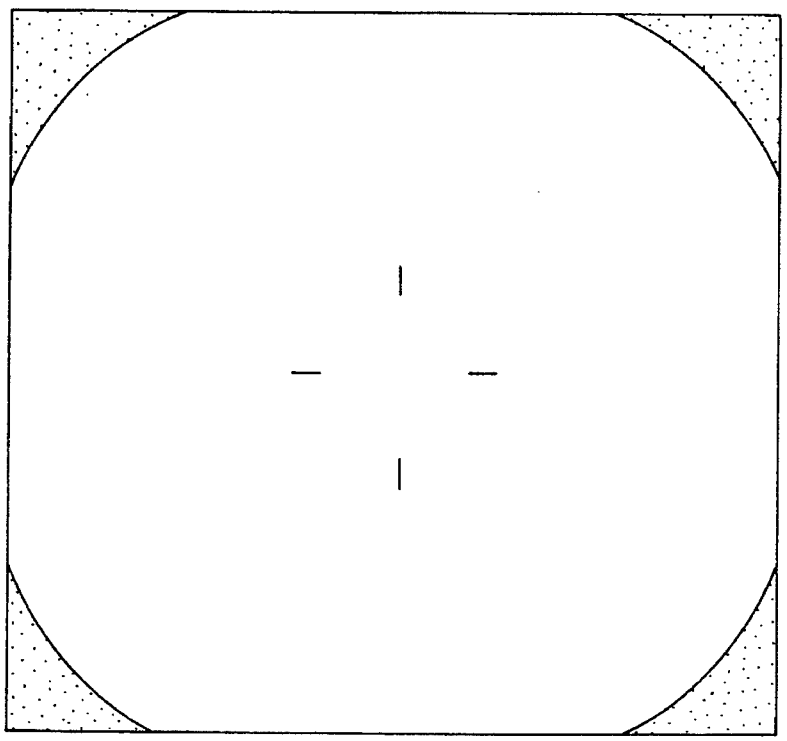
FIG. 28 shows the approximate location of the tick marks of a lens package, within an image.

The package center and the lens center do not have to be the same within the image field of view. However, even when these centers do not coincide, the package tic marks appear in regular patterns within the image. Typically the locations of these tic marks vary only a few pixels from image to image, and FIG. 28 shows, for example, the approximate location of the tic mark pattern within an image. Because the locations of these tic marks are so consistent, the preferred search routine to find the TMZ limits the field of search to a relatively small area within the image. In particular, the total image may contain 1,048,576 pixels, while the typical search area for the first tic mark may have about 3,000 pixels.

Figure 29:
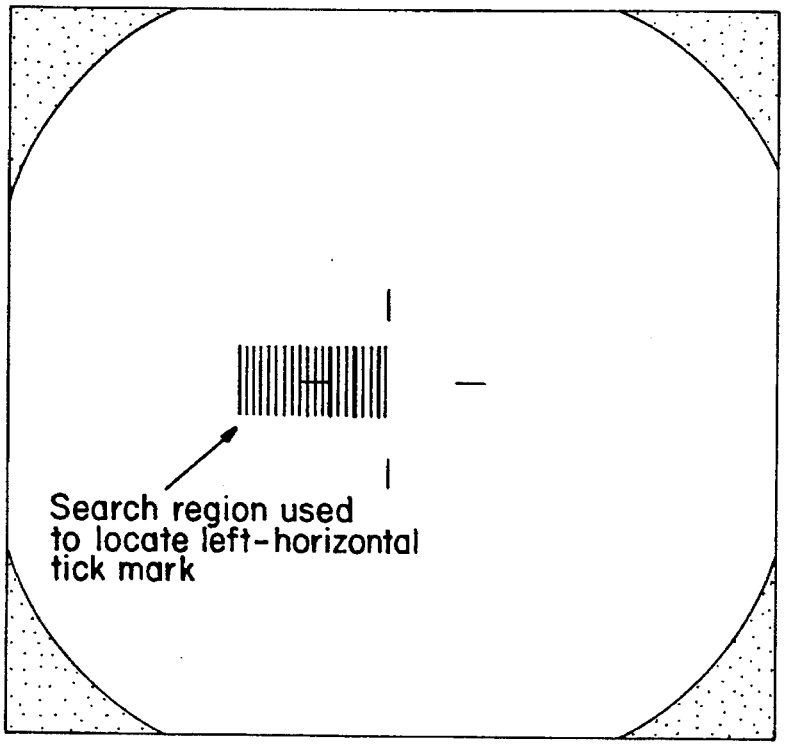
FIG. 29 shows a search region used to locate a first of the tic marks in an image.
Figure 30:
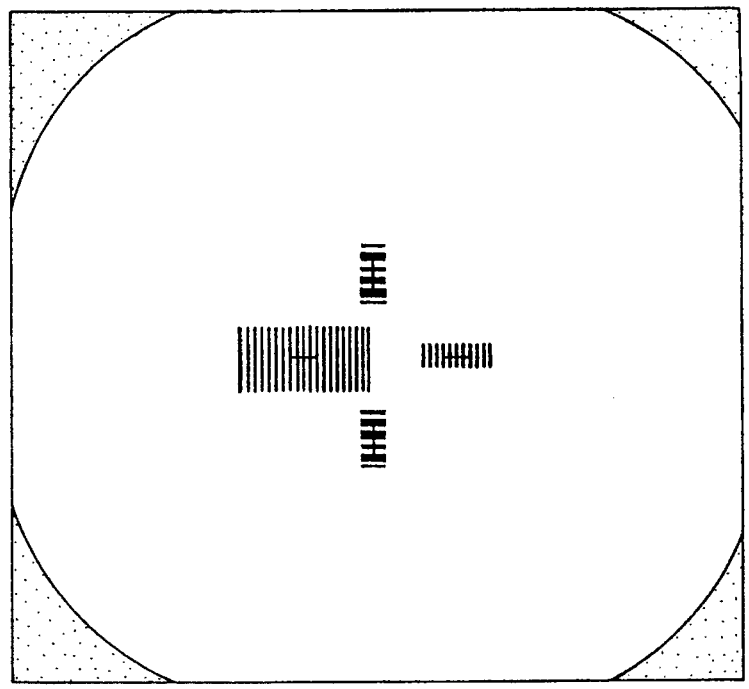
FIG. 30 shows search regions used to find additional tic marks.

With a preferred embodiment, a first of the TMZs is found by searching in a comparatively large region in which that TMZ is expected to be located. For example, FIG. 29 illustrates a search region that may be searched for a first tic mark. Once one TMZ is found, the position of that TMZ is used to help find the other TMZs. In particular, smaller but more precisely located search regions may be identified relative to the location of the first TMZ to look for the other TMZs. For example, the search regions for the second, third, and fourth tic marks may be only 400 pixels in area. FIG. 30 shows one example of search regions that may be used to locate the TMZ areas.

More specifically, preferably tic mark handling begins by searching a relatively large rectangular region to locate the left-horizontal tic mark. Row and column reference points that define the location of the search region are specified by the parameters "C_r_tickofst" and "C_c_tickofst," respectively. A large number of equally spaced column search vectors are traversed across the search region. Search vectors are traversed from top to bottom until a one-dimensional gradient magnitude indicates the presence of the tic mark boundary. Gradient calculation is defined by Equation (16).

$$\text{tick mark search gradient}=abs(P_{i-1,j}-P_{i,j}) \quad (16)$$

Figure 31:
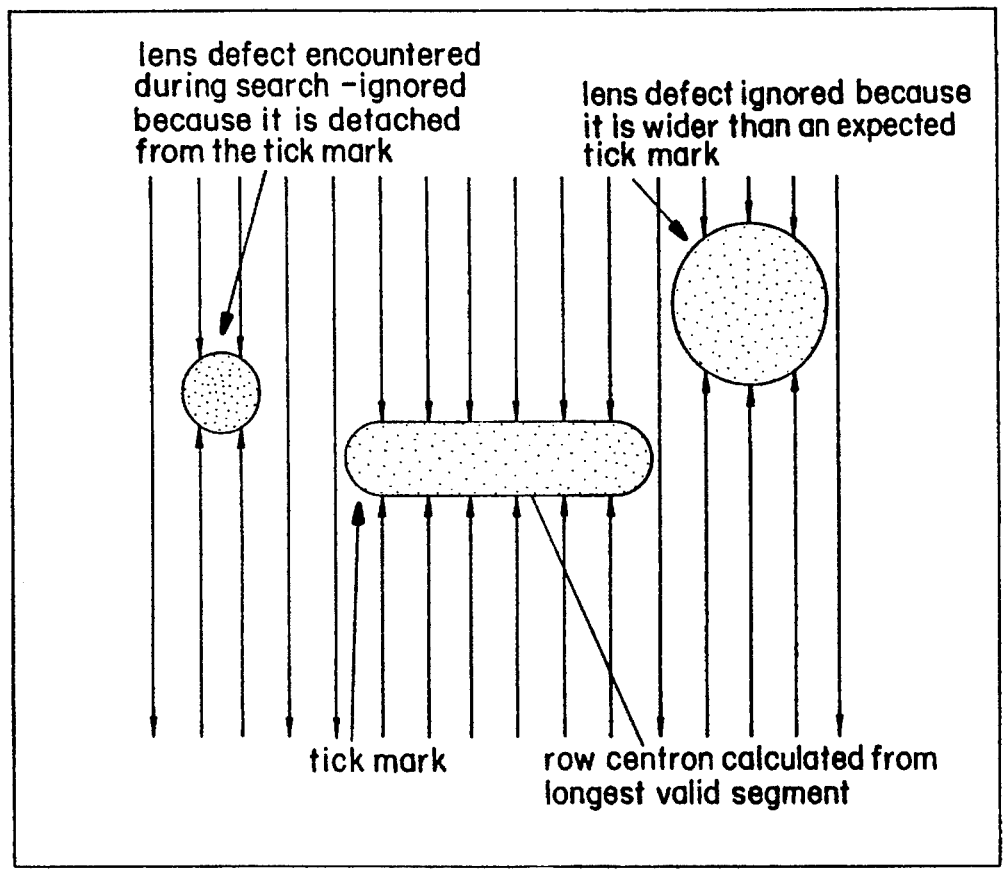
FIG. 31 illustrates search vectors that may be employed to identify a tic mark within a tic mark zone.

Gradient magnitude is compared to a threshold value found in a parameter "C_tickhthr." If, while searching along a particular search vector, a calculated gradient is greater than or equal to the threshold, the top boundary of a tick mark, along that search vector, is found. If a top boundary is found, a search is then conducted along the same column, from bottom to top, in order to locate the bottom boundary of the tic mark. This search vector cycle may be conducted for all search vectors within the search region; and for example, FIG. 31 shows a search region search vectors that may be used to locate the left-horizontal tic mark.

Boundary information about a tic mark, obtained from all the search vectors in the region of a tic mark is then analyzed to obtain the row centroid of the tic mark. Search vectors that have detected object boundaries that are too wide or too thin to be a tic mark, are preferably discarded. Preferably, those search vectors that did not find any object are also discarded. Next, the remaining vectors are checked to determine the longest segment of consecutive search vectors that identified a potential tic mark object, and the longest object identified is considered to be the tic mark. This procedure is designed to distinguish tic marks from smaller objects or items, referred to as noise, and from lens defects that may be encountered within the search region. The row centroid is then calculated from the search vector boundaries of the longest identified segment, and FIG. 31 also illustrates this search vector process and the relationship of the search vectors to row centroid determination.

The next step is to identify the column boundaries of the tic mark. To do this, two search vectors are searched, or traversed, along the already determined row centroid of the tic mark. These two vectors are searched outward from the column average of the longest identified segment. One of these vectors is searched to the left to find the left boundary of the tic mark, and the other vector is searched to the right to find the right boundary of the tic mark. A grey-level threshold is preferably used to identify column boundaries of the tic marks since flaws found in tic marks could cause gradient information to be misleading. In addition, flaws in a tic mark appear darker than the rest of the tic mark. For this reason, a search using a grey-level threshold procedure does not erroneously identify flaws inside the tic marks as boundaries of the tic mark, and a grey-level threshold is able to distinguish a tic mark from the lighter surrounding region.

Figure 32:
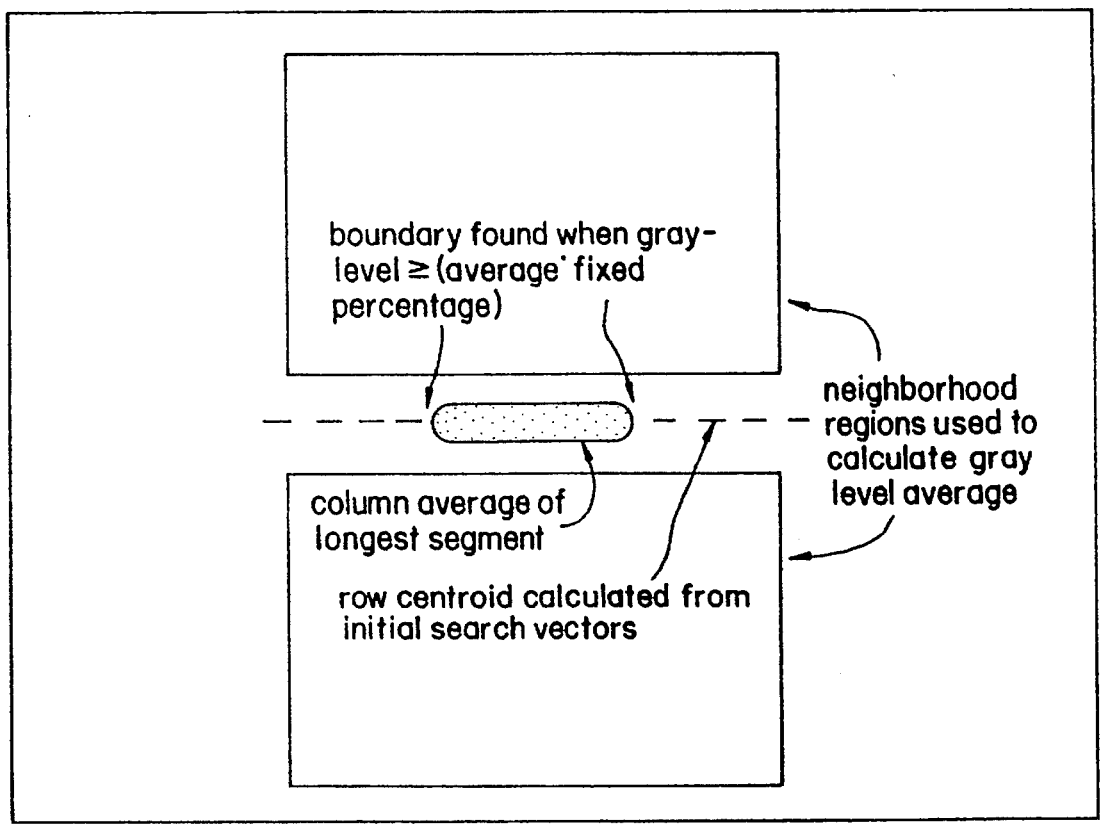
FIG. 32 shows two regions in an image that may be used to adjust the grey levels of a tic mark.

Preferably, the grey-level threshold used to identify row boundaries of a tick mark is calculated as a fixed percentage of the average grey-level of two regions that surround the tic mark. As an example, FIG. 32 shows two neighboring regions of a tic mark that may be used to calculate a grey-level threshold. When a pixel is encountered along the row search vector that is greater than or equal to this threshold, a boundary has been identified. The column centroid of the tic mark is then calculated from these two boundaries.

Figure 33:
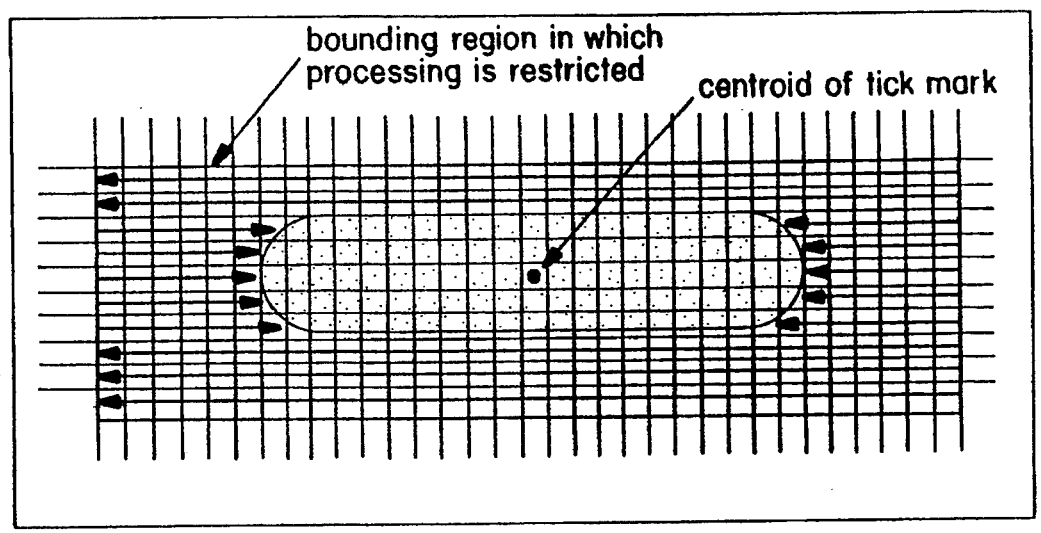
FIG. 33 illustrates how a tic mark is transformed.

Alternatively, a gradient calculation could be used to identify the left and right boundaries of a tic mark. To do this, for example, a search vector may be traversed from the right side of the bounding region leftward to find the right edge of the tic mark. Gradient magnitudes may be calculated according to Equation (1); and when a gradient is greater than or equal to the threshold specified by the parameter "C_tickwthr," the tic marks right boundary is found. A search vector may then be similarly traversed from the left side of the bounding region rightward to find the tic marks left boundary. FIG. 33 shows conceptually how a tic mark is handled on a row-by-row basis.

Once the location of a TMZ is determined, it is blended with the surrounding image information using a procedure referred to as an offset transformation. The transformation essentially raises the grey-level of the tic mark, on a row-by-row basis, to a level that allows it to blend in with its neighboring region. With this procedure, defect information is retained, and an analysis of the transformed region for defects is later performed by the same algorithm used for all other areas of the center zone of the lens.

Figure 34:
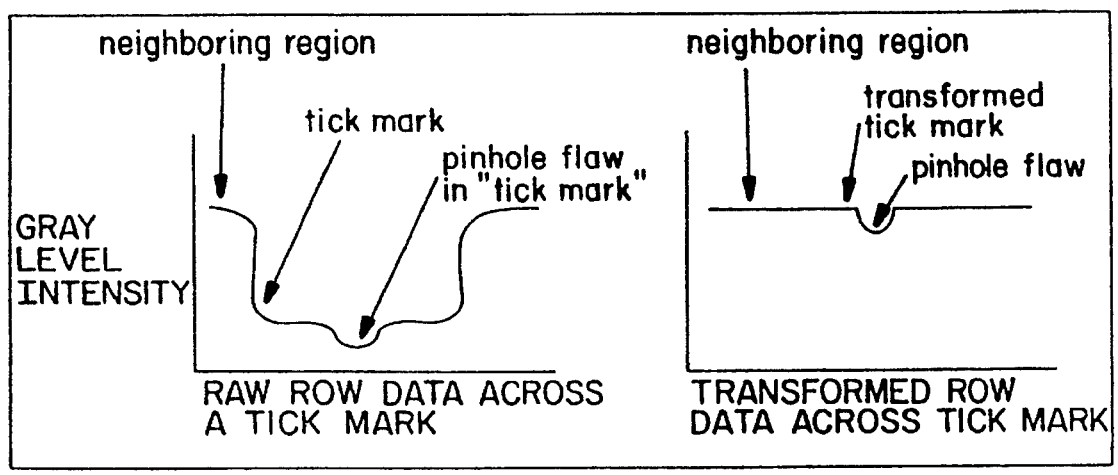
FIG. 34 illustrates the result of the transformation on a single row across a tic mark.

More specficially, in this procedure, the grey-levels for two areas near the TMZ are averaged. These two regions may be the same as those used during the tic mark's centroid determination, shown for example in FIG. 32. A difference, $\Delta_{row}$, is calculated between the average grey-level outside the TMZ and each of the tic mark rows; and for each row inside the TMZ, the value of $\Delta_{row}$ is added to the value of each pixel along that row. The result of this offset transformation for a TMZ row containing a defect is depicted in FIG. 34. As this Figure illustrates, the image of the pinhole flaw in the lens has been retained, but the TMZ itself has been blended into the neighboring region of the image surrounding the TMZ. Because of this attribute of the transformation process, the TMZ may now be examined uniformly as part of the CZ by the CZ inspection algorithm.

Alternatively, a TMZ may be processed, not only by means of the linear offset transformation, but also to increase the gain of the pixels within the TMZ prior to such a transformation. This may improve the ability of the inspection algorithm to detect defects within the TMZ. Multiplying the TMZ by some gain factor prior to determining the offset value $\Delta_{row}$ would increase the gradient of a defect object within the TMZ. However, this may also have the adverse effect of making the TMZ noisier.

Once row and column centroids are found, a transformation is performed on the "tic mark." The transformation is restricted to a small rectangular region that encompasses the "tic mark" and is centered about the "tic mark's" centroid. The height (short dimension) and width (long dimension) of the bounding region is specified by the parameter "C_tickhgt" and "C_tickwid," respectively.

The other three tic marks may be found and processed in the same manner. Preferably, the search regions for these other three tic marks are each somewhat smaller than the search region for the first tic mark, since starting locations for these other three tic marks are referenced from the left-horizontal tic mark centroid. Also, for vertical tic marks, the operations are rotated by 90 degrees because the long dimension of the tic mark is in the row direction instead of the column direction. FIG. 30 shows, for example, the search regions that may be used to find the other three tic marks.

As with the left-horizontal tic mark, the transformation of the tic mark grey values does not detect flaws. The tic marks are preprocessed to a point where they can be properly handled by the algorithm used in the lens Center Zone analysis. In this way, the tic marks themselves will not be considered flaws, but true flaws that overlap or lie within a tic mark will be detected.

Holes and Marks in Center Zone

Holes and marks in contact lenses typically appear as dark spots within the center zones of the images of the contact lenses. Such features may be discerned from the white background using gradient search algorithms. However, a gradient search to define objects in the CZ would take a comparatively large amount of time to perform. Because the entire image consists of 1,048,576 pixels, approximately 20 million operations would be required to test the entire image.

Figure 35:
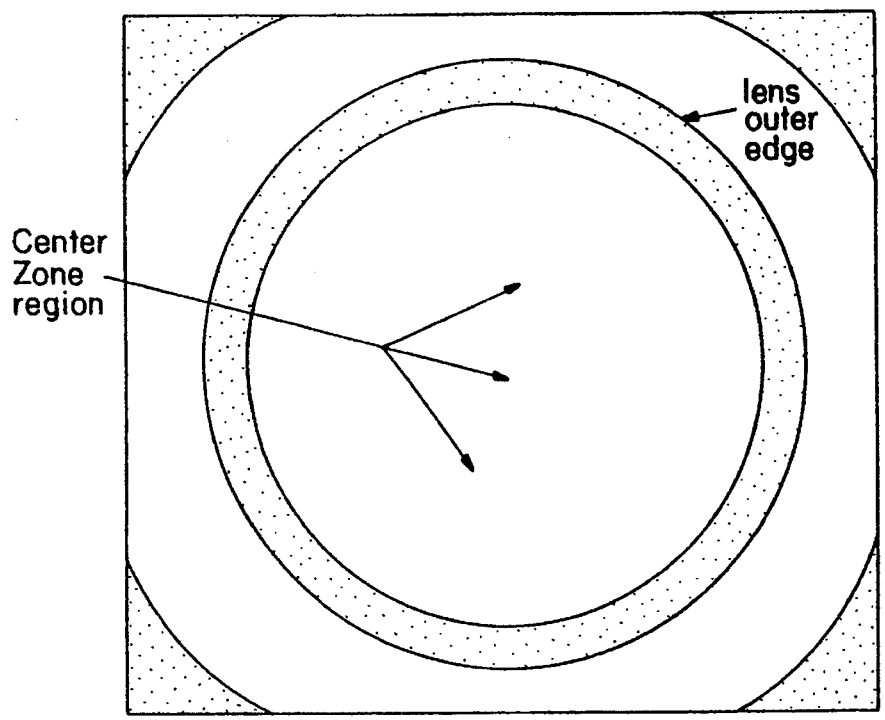
FIG. 35 graphically illustrates the center zone region of a lens.

The center zone of a lens is considered to be all portions of the lens interior to the peripheral zone, and FIG. 35 shows the location of this region. Actual boundaries for this region are preferably defined from the model of the Peripheral Zone/Center Zone edge that was derived during decentration calculation.

A modified version of blobs analysis is used as a means of detecting flaws. Like the analysis of the peripheral zone, discussed below, blobs analysis of the central zone uses eight connectivity analysis to segment objects. However, two important differences exist in the implementation of blobs analysis in the peripheral and center zones. In the central zone, the pixel characteristic used to distinguish foreground objects from background is strictly gradient magnitude. This magnitude is defined by Equation (17).

$$\text{gradient} = abs\ (P_{i,j-1} - P_{i,j+1}) + abs(P_{i-1,j} - P_{i+1,j}) \tag{17}$$

If the gradient magnitude of a pixel is greater than or equal to the threshold specified by the parameter "C_czbinthr," the object is considered to be foreground.

The second difference is that, in the central zone, blobs analysis is implemented such that the region processed uses a pseudo subsampled technique. Pixels in every other row and every other column are used in the blob's connectivity analysis. The gradient calculation, however, uses the actual neighbors of the pixel being processed, as described above in Equation (17). FIG. 36 shows the neighborhoods used for subsampling and gradient calculations.

Once a full pass has been made over the image, the sizes of those objects found are calculated. Those objects that exceed the object size specified by the parameter "C_czminblob" are considered severe enough to fail the lens. If one or more of these objects has been found, the lens is failed and further processing is aborted.

By using a subsampling technique, the same area can be processed with fewer operations. FIG. 36 shows the basic scheme of the pixel subsampling pattern chosen to reduce the number of needed calculations to under 1,310,720. Visually, this search scheme appears like a modified checkered design. Every other row and every other column are skipped during analysis of the point of interest.

At each subsampled pixel, the surrounding pixels are analyzed by a bi-directional gradient operation of equation (18) to determine if there are large gradients near the pixel of interest.

$$G=(abs(P_{ij-1}-P_{ij+1})+abs(P_{t-ij}-P_{t+ij})) \qquad (18)$$

If there is a gradient larger than parameter C_czbinthr, then that pixel is placed in a specified section of processor memory, referred to as foreground. As soon as this occurs, the pixel is tested using blob analysis to determine the object in the foreground space to which the pixel belongs, i.e., this analysis determines if there are any objects nearby to which the pixel of interest belongs. If the pixel of interest does not belong to any existing objects, a new object is identified. However, if the pixel of interest belongs to an existing object, the object is tested against a size threshold. If adding the newest pixel of interest to the object places the object over the total foreground pixel size threshold, C_czminblob, then the object is considered too large and the lens is failed.

Thus, it may not be necessary to evaluate the entire image within the boundary of the CZ. If an object is found that exceeds the threshold for maximum size, C_czminblob, further processing is aborted.

Any object encountered in the subsampled search of the CZ is detected as a defect if it is large enough. For instance, the threshold C_czminblob may be 25 pixels in area. Since that is in units of subsampled pixels, it is actually representative of a 9×9, or 81 pixels in area using object space. In one embodiment of system 10, nine pixels are 127 microns in length, and thus 5 pixels cover 71 microns. Therefore, with this procedure, the longest possible acceptable CZ defect will cover 9×2=18 pixels of area and have a maximum dimension of 127 microns. However, due to both pixel overlap and the fact that the gradient calculation effectively adds to the width of an object, smaller defects are easily detected by the preferred inspection algorithms.

For example, perfectly round objects appear to be larger foreground objects than actual objects. In practice, an 0.080 millimeter diameter flaw on a calibration standard defect is detected by the algorithm substantially 100% of the time. Because the 80 micron dot extends across an actual 6 pixels, it is found by the gradient calculations of the subsampled pixels and establishes itself as a foreground object spanning 9 actual pixels, 5 pixels in foreground space. This causes the algorithm to reject the lens on the basis that the flaw exceeds the C_czminblob parameter. This means that the minimum rejectable center defect is set at 80 microns, for a C_czminblob parameter equal to 25 pixels of area in foreground space. If C_czminblob was set at 16, then this size would shrink to a minimum rejectable center defect of 45 microns. However, it has been found that excellent results may be obtained when C_czminblob is set at 25.

Puddles

Figure 37:
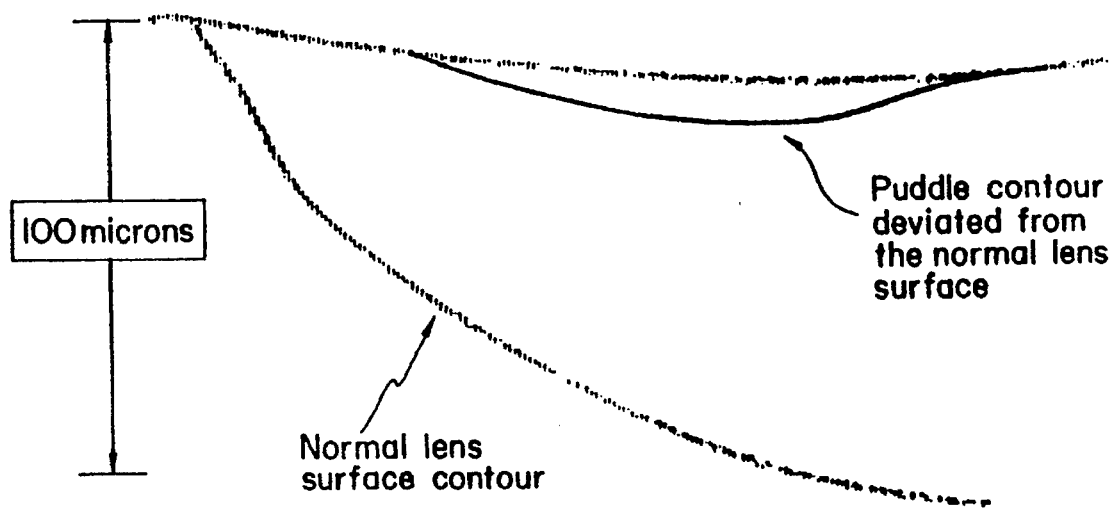
FIG. 37 shows a cross-section of a typical lens puddle.

Puddles, which are cosmetic flaws, are slight depressions in the surface of the lens, and FIG. 37 shows a cross section of a typical puddle. The depression only involves one of the lens surfaces, unlike another defect known as a hole, which penetrates the entire lens. Since the depression is very gradual, puddles are, in general, difficult to see in a white light illumination system. Phase contrast systems, such as a modified Schlieren system, tend to enhance the edges of the puddles better. In a white light system, such as employed in system 10, only the deepest and most severe puddles are normally visible. In a phase contrast system, even index of refraction deviations caused by the heat from a finger are discernable. The result of the phase contrast hyper-sensitivity is that it tends to enhance less serious cosmetic flaws and display them in such a way as to reject lenses unnecessarily. In a phase contrast system of illumination, very shallow puddles appear just as serious as do the deeper flaws.

Puddles tend to occur primarily on the outer region of the lenses and are the result of subtle variations in the SSM process. Lens puddles form during the curing process. Some puddles may disappear or become virtually invisible when a lens is hydrated, in which case the puddle is said to hydrate away. What actually occurs is that the hydration process smoothes the edges of a nearly invisible puddle into an invisible surface irregularity.

The preferred embodiment of the algorithm inspects for puddles in two areas, the center zone, CZ, and the peripheral zone, PZ. The approaches to finding puddles in these two different zones originate from the actual appearances of puddles in these regions. In the CZ, puddles appear as dark lines on a white background, while in the PZ, the puddles are partially obscured by image noise and appear to have white halo accents.

Puddles in the Center Zone

Any puddle severe enough to cast a dark line in the CZ is rejectable in the same manner as any other mark. Preferably, the algorithm does not distinguish between individual defects. It is not important which CZ defect causes the image processor to fail the lens. A pristine lens will pass, and a lens with a puddle, or any other type of flaw in the CZ, will fail and consequently be rejected by the inspection system.

Puddles that enter into the CZ are usually very large. Moreover, such puddles usually cross the PZ/CZ junction. Puddles that cross this junction are harder to detect in the region of the PZ than in the CZ. Less severe puddles, which have shallower depths and fainter lines, are more visible in the CZ than in the PZ.

Puddles in the Peripheral Zone

Figure 38:
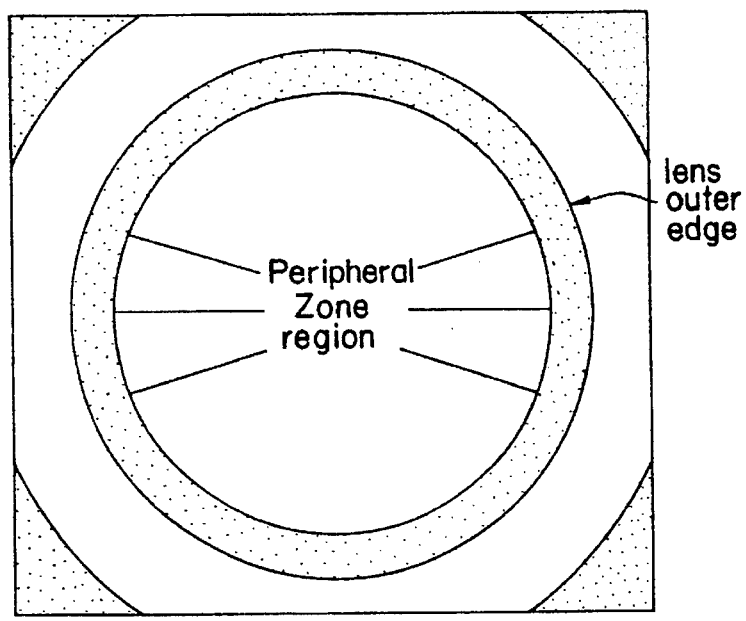
FIG. 38 graphically shows the peripheral zone of a lens.

The peripheral zone is considered to be an annulus shaped region bounded by the outer edge of the lens and the boundary between the peripheral and center zones of the lens, and FIG. 38 shows this region of a lens. Puddles in the PZ do not fall within the normal definition of center of lens flaws. Nevertheless, preferably, the inspection algorithm is able to find puddles in the PZ.

The peripheral zone has some special features associated with it that warrant it being processed separately from the center zone. The grey-level of the peripheral zone is significantly lower than the center zone which causes noticeable gradients when passing from one zone to the other. These resulting gradient magnitudes could easily be mistaken for flaws, or could reduce detection sensitivity, if a thresholding test was used as a means of compensation. The lower grey-level in the peripheral zone is also accompanied by a texture, both of which cause flaws to be less pronounced. Also, since the PZ boundary is irregularly shaped, or rough, and contains gradient magnitudes within its annular region, many of these noisy image features resemble flaws. Finally, the peripheral zone is a region in which puddles are typically located. As mentioned above, puddles are characterized by subtle edges that tend to be parallel or perpendicular to the curvature of the lens outer edge.

A modified version of blobs analysis is used as a means of segmenting foreground objects from background objects. If the foreground objects meet certain size and intensity criteria, they are considered to be flaws. Intensity criteria, which is used to distinguish individual pixels as foreground from background, is specified by the parameter "C_pztanthr." Size criteria is specified by the parameter "C_pzminblob."

Blobs analysis makes a single raster scan pass over the image, determines connectivity of each new pixel with existing objects, and assigns unique labels to all newly encountered objects. A linked list keeps track of all objects found in the image and is updated in the event that objects which were initially determined to be separate become connected later in the image. Connectivity is preferably implemented such that if a pixel-of-interest is considered a foreground pixel and any of its eight immediate neighbors belongs to a particular object, then that pixel-of-interest is assigned to that particular object. In other words, the blob's segmentation analysis is based on eight connectivity analysis.

Each pixel in the PZ annular region is considered for inclusion into the image foreground in a heavily modified blob analysis. All foreground pixels are classified as part of objects that, if they exceed size limitations, cause rejection of the lens.

Traditional blob analysis requires a binary image, where each pixel has the value of zero or one, i.e., foreground or background. In the preferred algorithm used in system 10, the characteristic distinguishing a pixel from foreground to background is the scalar dot product of the pixel gradient magnitude vector and the tangent direction vector. If the dot product result is larger than C_pztanthr, the pixel is considered part of the foreground.

Figure 39:
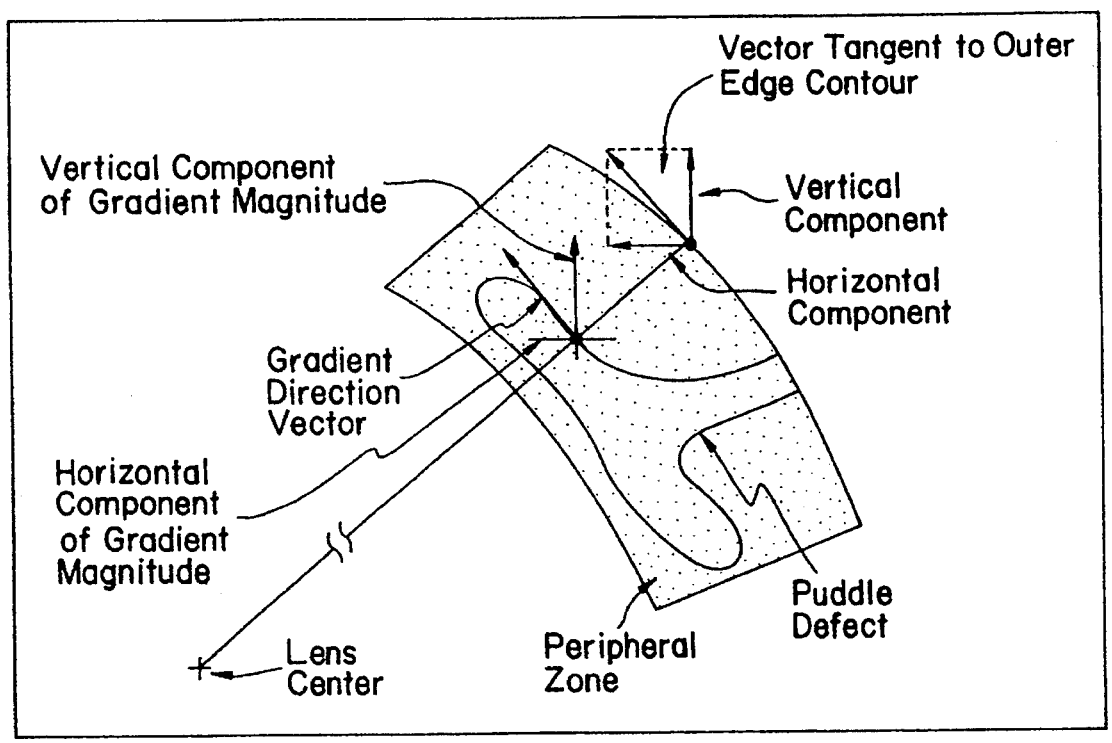
FIG. 39 shows the relationship between the gradient magnitude vector and the tangent direction vector.

Blobs analysis is typically implemented on binary images where segmentation is based on pixel values of 0s and 1s. Implementation of blobs analysis in the peripheral zone is unique in that the pixel characteristic used to distinguish foreground objects from background is the vector dot product of the pixel's gradient magnitude vector and a tangent direction vector. The gradient magnitude vector of a pixel consists of its horizontal and vertical gradient components. The tangent direction vector of a pixel consists of weights based on the horizontal and vertical components of a vector that is tangent to the outer edge of the lens. The point on the outer edge at which the tangent is taken is defined by a line that intersects the pixel-of-interest and the center of the lens. FIG. 39 shows the relationship of both vectors.

In general, if the direction of the gradient vector G(f(x,y)) is parallel to the tangent vector on the lens edge, then the resulting dot product will be large. This circumstance occurs when a puddle edge inside the PZ extends parallel to the lens edge.

The dot product between the gradient vector and the tangent vector on the lens edge, is defined in equation (19).

$$\text{Dotproduct} = T * G = \begin{bmatrix} T_x \\ T_y \end{bmatrix} \begin{bmatrix} G_x \\ G_y \end{bmatrix} \quad (19)$$

Tangent direction vector and gradient magnitude vector components are calculated in a manner referred to as on the fly for every pixel found in the peripheral zone region. The tangent direction vector and its components are described in Equations (20) and (21).

$$\text{horizontal}_{tan} = (\text{row}_{POI} - \text{row}_{lens}) * \text{Scale Factor}/\text{radius}_{POI} \quad (20)$$

where the subscripts;
tan=a component associated with the tangent direction vector
POI=a coordinate position of the "pixel-of-interest"
lens=a coordinate position of the lens' center
and,
Scale Factor is specified by the parameter "C_pzscale".

$$\text{vertical}_{tan} = (\text{column}_{lens} - \text{column}_{POI}) * \text{Scale Factor}/\text{radius}_{POI} \quad (21)$$

where the subscripts;
tan=a component associated with the tangent direction vector
POI=a coordinate position of the "pixel-of-interest"
lens=a coordinate position of the lens' center
and,
Scale Factor is specified by the parameter "C_pzscale".

As Equations (20) and (21) stand, enhancement is provided for those gradients that are parallel to the tangent vector. Enhancement is greatest for those edges exactly parallel to the tangent vector and decreases to a minimum as the gradient becomes perpendicular to the tangent vector.

Since it is actually desirable to enhance those gradients that are close to perpendicular as well as parallel to the tangent vector, a check is made to determine which case the gradient is closest to and an adjustment is potentially made to Equation (20) and (21) results. To determine whether the gradient is closer to parallel or perpendicular, a comparison between the tangent direction vector's dominant component and the gradient magnitude vector's dominant component is made. If the dominate gradient magnitude vector component is different than the dominate tangent direction vector component, then the gradient is closer to perpendicular than parallel. For example, if the gradient magnitude vector's vertical component is greater than its horizontal component and the tangent direction vector's horizontal component is greater than its vertical component; the gradient is closer to perpendicular than parallel. Equation (22) shows the adjustment made if this is the case.

If the gradient is closer to being perpendicular than parallel to the tangent vector, $$\begin{aligned} \text{temporary result} &= \text{horizontal}_{tan} \\ \text{horizontal}_{tan} &= \text{vertical}_{tan} \\ \text{vertical}_{tan} &= \text{temporary results} \end{aligned} \quad (22)$$

Equations (23) and (24) give maximum weight to those gradients that are exactly parallel or perpendicular to the tangent vector. Weights trail off to a minimum at ±45 degrees from parallel or perpendicular. The resulting tangent direction vector is shown in Equation (23).

$$\text{tangent direction vector} = \begin{bmatrix} \text{horizontal}_{tan} \\ \text{vertical}_{tan} \end{bmatrix} \quad (23)$$

A pixel's gradient magnitude vector and components are detailed in Equations (24) through (26).

$$\text{horizontal}_{gm} = abs(P_{i-1,j+1} + 2*P_{i-1,j} + P_{i-1,j-1} - (P_{i+1,j+1} + 2*P_{i+1,j} + P_{i+1,j-1})) \quad (24)$$

where;
horizontal$_{gm}$=horizontal component of the gradient magnitude vector.

$$\text{vertical}_{gm} = abs(P_{i-1,j+1} + 2*P_{i,j+1} + P_{i+1,j+1} - (P_{i-1,j-1} + 2*P_{i,j-1} + P_{i+1,j-1})) \quad (25)$$

where;
vertical$_{gm}$=vertical component of the gradient magnitude vector.

$$\text{gradient magnitude vector} = \begin{bmatrix} \text{horizontal}_{gm} \\ \text{vertical}_{gm} \end{bmatrix} \quad (26)$$

The resulting vector dot product is shown in Equation (27).

$$\begin{aligned}
\text{vector dot product} &= \text{gradient magnitude vector} \cdot \text{tangent direction vector} \\
&= \begin{bmatrix} \text{horizontal}_{gm} \\ \text{vertical}_{gm} \end{bmatrix} \cdot \begin{bmatrix} \text{horizontal}_{tan} \\ \text{vertical}_{tan} \end{bmatrix} \\
&= (\text{horizontal}_{gm} * \text{horizontal}_{tan}) + (\text{vertical}_{gm} * \text{vertical}_{tan})
\end{aligned} \quad (27)$$

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A system for inspecting ophthalmic lenses, comprising:
   a transport subsystem for moving the lenses into an inspection position;
   an illumination subsystem to generate a light beam and to direct the light beam through the lenses in the inspection position;
   an imaging subsystem to generate a set of signals representing selected portions of the light beam transmitted through the lenses; and
   an image processing subsystem to receive said signals from the imaging subsystem and to process said signals according to a predetermined program to identify at least one condition of each of said lenses;
   wherein the illumination subsystem includes
   i) a light source to generate the light beam,
   ii) means to direct the light beam generally in a first direction and through lenses in the inspection position,
   iii) a diffuser located in the path of the light beam to form the light beam with a generally uniform intensity across a transverse cross-section of the light beam,
   iv) a lens assembly to focus a portion of the light beam passing through the lenses onto an image plane, and to focus a portion of the light beam onto a focal point in front of the image plane to form a diffuse background pattern on the image plane.

2. A system according to claim 1, wherein the lens assembly includes a doublet lens and a field lens located in series between the light source and the inspection position.

3. A system according to claim 2, wherein the doublet lens has a first focal point in the diffuser and a second focal point in front of the image plane.

4. A system according to claim 3, wherein the ophthalmic lenses are in packages having an optical power, and the field lens compensates for the optical power of the packages.

5. A method for inspecting ophthalmic lenses, comprising:
   moving the lenses into an inspection position;
   generating a light beam;
   generally directing the light beam in a first direction and through the lenses in the lens inspection position;
   focusing a portion of the light beam passing through the lenses onto an image plane to form images of the lenses on said plane;
   focusing a portion of the light beam onto a focal point in front of the image plane to form a diffuse background pattern on the image plane;
   generating a set of signals representing the lens images formed on the image plane;
   processing said signals according to a predetermined program to identify at least one condition of each of the lenses.

6. A method according to claim 5, wherein the lenses are located in packages having an optical power, and wherein:
   the step of focusing a portion of the light beam onto the image plane includes the step of locating a field lens below the inspection position to compensate for the optical power of said packages; and
   the step of focusing a portion of the light beam onto a focal point in front of the image plane includes the step of locating a doublet lens below the field lens.

7. A method according to claim 6, wherein the step of directing the light beam in the first direction includes the step of diffusing the light beam to provide the light beam with a generally uniform intensity in a plane transverse to said first direction.

8. A method according to claim 7, wherein: the diffusing step includes the step of locating a diffuser in the path of the light beam; and
   the step of locating the doublet lens includes the step of positioning the doublet lens with a first focal point on the diffuser.

9. A system for inspecting ophthalmic lenses, comprising
   a lens holder for holding the lenses in an inspection position;
   an array of pixels;
   an illumination subsystem to generate a light beam and to direct the light beam through the lenses in the inspection position and onto the pixel array and including
   i) a light source to generate the light beam,
   ii) a diffuser located in a path of the light beam to diffuse the light beam, and
   iii) a lens assembly located in the path of the light beam to focus a portion of the light beam passing through the lenses onto the pixel array, and to focus a portion of the light beam onto a focal point in front of the pixel array to form a diffuse background pattern on the pixel array;
   an imaging subsystem to generate a set of signals representing the light beam incident on the pixel array; and
   an image processing subsystem to receive said signals from the imaging subsystem and to process said signals according to a predetermined program to identify at least one condition of each of the lenses.

10. A system according to claim 9, wherein the ophthalmic lenses have center and peripheral zones and borders between said zones, and wherein the illumination subsystem is adapted to produce an image on the pixel array of the borders between the center and peripheral zones of the lenses.

11. A system according to claim 10, wherein the lens assembly includes:
- a field lens located between the light source and the inspection position; and
- a doublet lens located between the light source and the field lens.

12. A system according to claim 11, wherein the doublet lens has a first focal point on the diffuser.

13. A method for inspecting ophthalmic lenses, comprising:
- placing the lenses in an inspection position;
- generating a light beam;
- directing the light beam through the lenses and onto an array of pixels to form images of the lenses thereon;
- locating a diffuser in a path of the light beam to diffuse the light beam;
- positioning a doublet lens in the path of the light beam to focus a portion of the light beam onto a focal point forward of the pixel array;
- positioning a field lens in the path of the light beam to focus a portion of the light beam passing through the lenses onto the pixel array;
- generating a set of signals representing the lens images formed on the pixel array; and
- processing said signals according to a predetermined program to identify at least one condition of each of the lenses.

14. A method according to claim 13, wherein the lenses have center and peripheral zones and boundaries between said zones, and the directing step includes the step of forming images on the pixel array of the boundaries between the center and peripheral zones of the lenses.

15. A method according to claim 14 wherein the lenses are in packages having an optical power, and the step of positioning the field lens includes the step of compensating for the optical power of the lens packages.

16. A method according to claim 15, wherein the step of positioning the field lens includes the step of positioning the field lens between the doublet lens and the inspection position.

* * * * *